(12) United States Patent
Lauer et al.

(10) Patent No.: US 8,498,359 B2
(45) Date of Patent: Jul. 30, 2013

(54) TRANSMISSION ACKNOWLEDGMENT WITHIN MULTIPLE USER, MULTIPLE ACCESS, AND/OR MIMO WIRELESS COMMUNICATIONS

(75) Inventors: Joseph Paul Lauer, North Reading, MA (US); Joonsuk Kim, San Jose, CA (US); Vinko Erceg, Cardiff by the Sea, CA (US); Matthew James Fischer, Mountain View, CA (US); Peiman Amini, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 475 days.

(21) Appl. No.: 12/794,711

(22) Filed: Jun. 4, 2010

(65) Prior Publication Data
US 2010/0310003 A1    Dec. 9, 2010

Related U.S. Application Data

(60) Provisional application No. 61/185,153, filed on Jun. 8, 2009, provisional application No. 61/184,420, filed on Jun. 5, 2009.

(51) Int. Cl.
*H04B 7/02*    (2006.01)
*H04L 1/02*    (2006.01)

(52) U.S. Cl.
USPC ........... 375/267; 375/260; 375/299; 370/203; 370/208

(58) Field of Classification Search
USPC ................ 375/260, 267, 299; 370/203–211
See application file for complete search history.

(56) References Cited

U.S. PATENT DOCUMENTS

| 7,062,703 | B1 | 6/2006 | Keaney | |
|---|---|---|---|---|
| 2005/0025080 | A1 | 2/2005 | Liu | |
| 2007/0097946 | A1 | 5/2007 | Mujtaba | |
| 2007/0211620 | A1* | 9/2007 | McBeath et al. | 370/209 |
| 2007/0286226 | A1* | 12/2007 | Yoon et al. | 370/445 |

(Continued)

FOREIGN PATENT DOCUMENTS

| WO | 2010021900 A2 | 2/2010 |
|---|---|---|
| WO | 2011006108 A2 | 1/2011 |

OTHER PUBLICATIONS

European Search Report for EP Application No./Patent No. 11001048.5-2411, dated Jun. 1, 2011, 7 pages.

(Continued)

*Primary Examiner* — Curtis Odom
(74) *Attorney, Agent, or Firm* — Garlcik & Markison; Shayne X. Short

(57) ABSTRACT

Transmission acknowledgement within multi-user wireless communication systems. Within multi-access wireless communication systems such as those operating in accordance with multi-user multiple input multiple output (MU-MIMO), orthogonal frequency division multiple access (OFDMA), and/or MU-MIMO/OFDMA, acknowledgement of receipt (e.g., using ACKs) is provided back to the sending or transmitting wireless communication device from each (or a subset) of the intended recipient wireless communication devices. Appropriate coordination of these ACKs from the respective, receiving wireless communication devices may be performed using instructions embedded within a multi-user packet that is provided to the receiving wireless communication devices. Alternatively, polling as effectuated by the sending or transmitting wireless communication device may be used to give explicit direction to the respective, receiving wireless communication devices of the manner by which their respective ACKs should be provided to the transmitting wireless communication device.

37 Claims, 34 Drawing Sheets

U.S. PATENT DOCUMENTS

| | | |
|---|---|---|
| 2008/0181156 A1 | 7/2008 | Ecclesine |
| 2008/0186890 A1 | 8/2008 | Shao |
| 2009/0040970 A1* | 2/2009 | Ahmadi et al. ............... 370/329 |
| 2009/0100170 A1* | 4/2009 | Schneider et al. ............ 709/224 |

OTHER PUBLICATIONS

European Search Report for EP Application No./Patent No. 11004382.5-1246, dated Sep. 27, 2011, 3 pages.

* cited by examiner

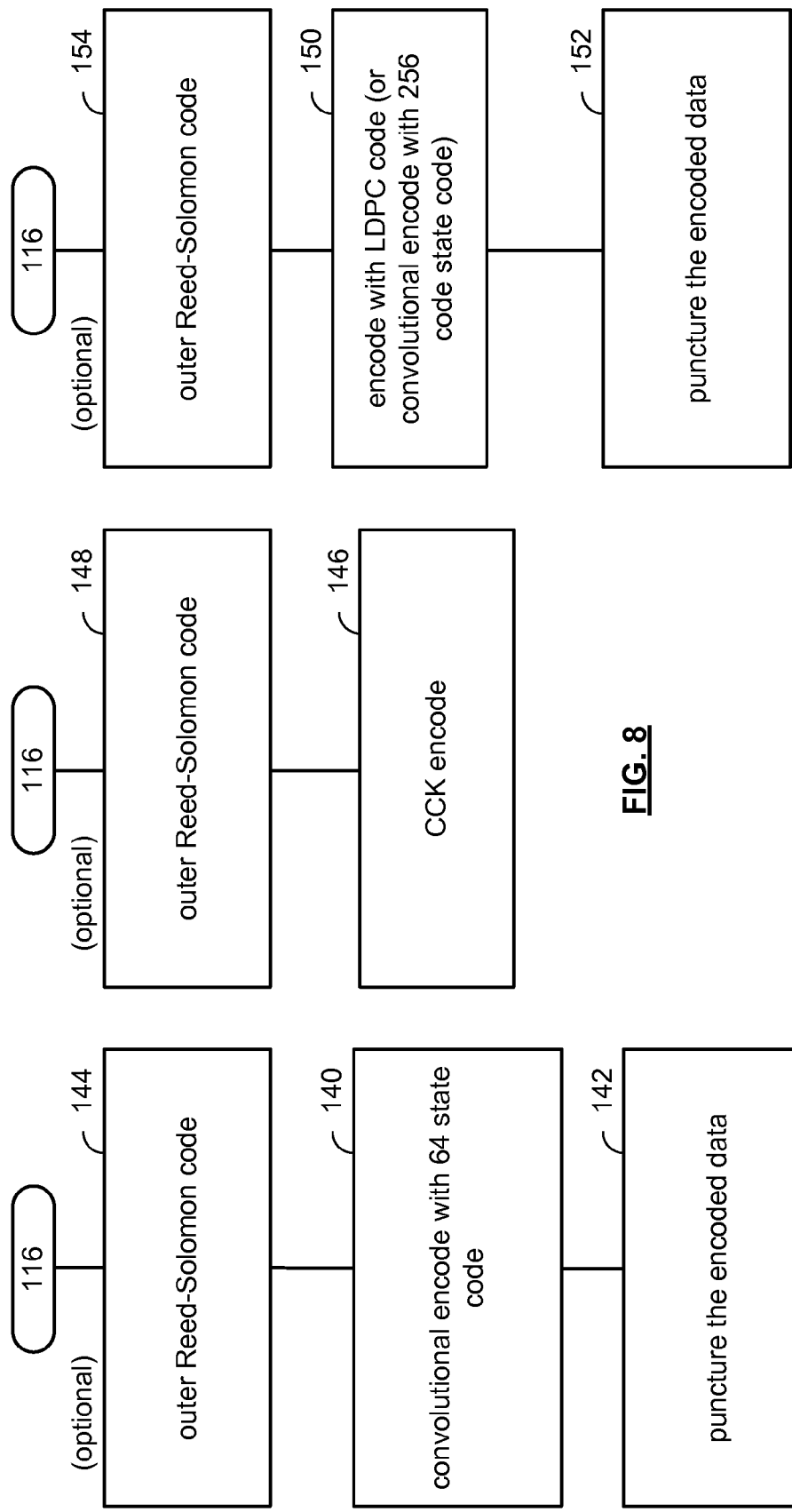

TRANSMISSION ACKNOWLEDGMENT WITHIN MULTIPLE USER, MULTIPLE ACCESS, AND/OR MIMO WIRELESS COMMUNICATIONS

CROSS REFERENCE TO RELATED PATENTS/PATENT APPLICATIONS

Provisional Priority Claims

The present U.S. Utility patent application claims priority pursuant to 35 U.S.C. §119(e) to the following U.S. Provisional Patent Applications which are hereby incorporated herein by reference in their entirety and made part of the present U.S. Utility patent application for all purposes:

1. U.S. Provisional Application Ser. No. 61/184,420, entitled "OFDMA cluster parsing and acknowledgement to OFDMA/MU-MIMO transmissions in WLAN device,", filed Jun. 5, 2009.

2. U.S. Provisional Application Ser. No. 61/185,153, entitled "OFDMA cluster parsing and acknowledgement to OFDMA/MU-MIMO transmissions in WLAN device,", filed Jun. 8, 2009.

INCORPORATION BY REFERENCE

The following U.S. Utility patent application is hereby incorporated herein by reference in its entirety and is made part of the present U.S. Utility patent application for all purposes:

1. U.S. Utility patent application Ser. No. 12/794,707, entitled "Cluster parsing for signaling within multiple user, multiple access, and/or MIMO wireless communications,", filed concurrently on Jun. 4, 2010, pending.

BACKGROUND OF THE INVENTION

1. Technical Field of the Invention

The invention relates generally to wireless communication systems; and, more particularly to clustering of signaling within such wireless communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11x, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Typically, the transmitter will include one antenna for transmitting the RF signals, which are received by a single antenna, or multiple antennae (alternatively, antennas), of a receiver. When the receiver includes two or more antennae, the receiver will select one of them to receive the incoming RF signals. In this instance, the wireless communication between the transmitter and receiver is a single-output-single-input (SISO) communication, even if the receiver includes multiple antennae that are used as diversity antennae (i.e., selecting one of them to receive the incoming RF signals). For SISO wireless communications, a transceiver includes one transmitter and one receiver. Currently, most wireless local area networks (WLAN) that are IEEE 802.11, 802.11a, 802.11b, or 802.11g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennae and two or more receiver paths. Each of the antennae receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennae to a receiver. The receiver includes a single receiver path that receives the multiple RF signals from the transmitter. In this instance, the receiver uses beam forming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

With the various types of wireless communications (e.g., SISO, MISO, SIMO, and MIMO), it would be desirable to use one or more types of wireless communications to enhance data throughput within a WLAN. For example, high data rates can be achieved with MIMO communications in comparison to SISO communications. However, most WLAN include legacy wireless communication devices (i.e., devices that are compliant with an older version of a wireless communication standard). As such, a transmitter capable of MIMO wireless communications should also be backward compatible with legacy devices to function in a majority of existing WLANs.

Therefore, a need exists for a WLAN device that is capable of high data throughput and is backward compatible with legacy devices.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL
VIEWS OF THE DRAWINGS

FIGS. 7-9 are diagrams illustrating various embodiments for encoding the scrambled data.

FIGS. 21, 22, 23, 24, 25, 26, 27, 28, and 29 are signal diagrams illustrating embodiments of time slotted or scheduled acknowledgement sequences when one or more STAs share channel (e.g., OFDMA and/or MU-MIMO).

Figure 30:
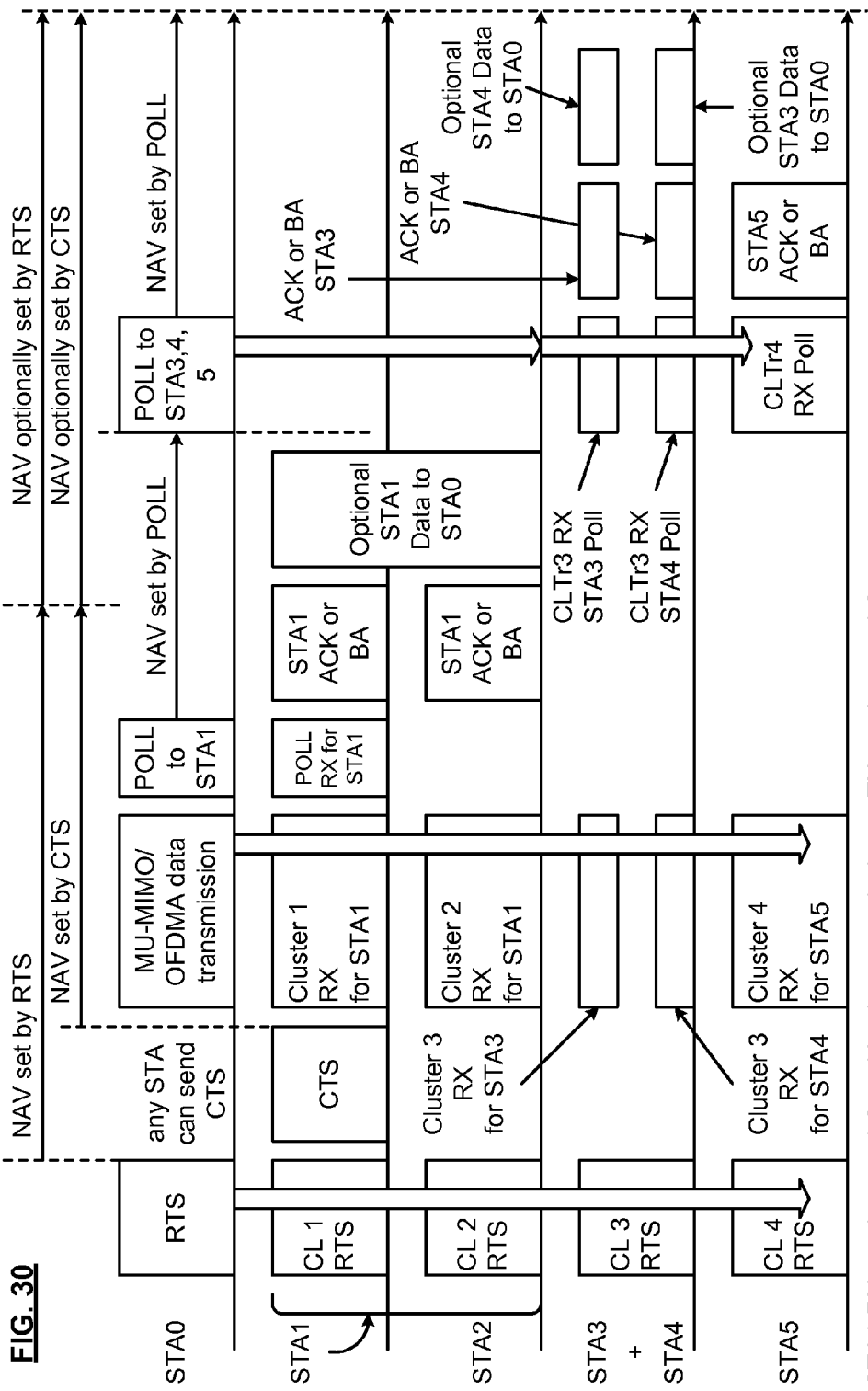
Figure 31:
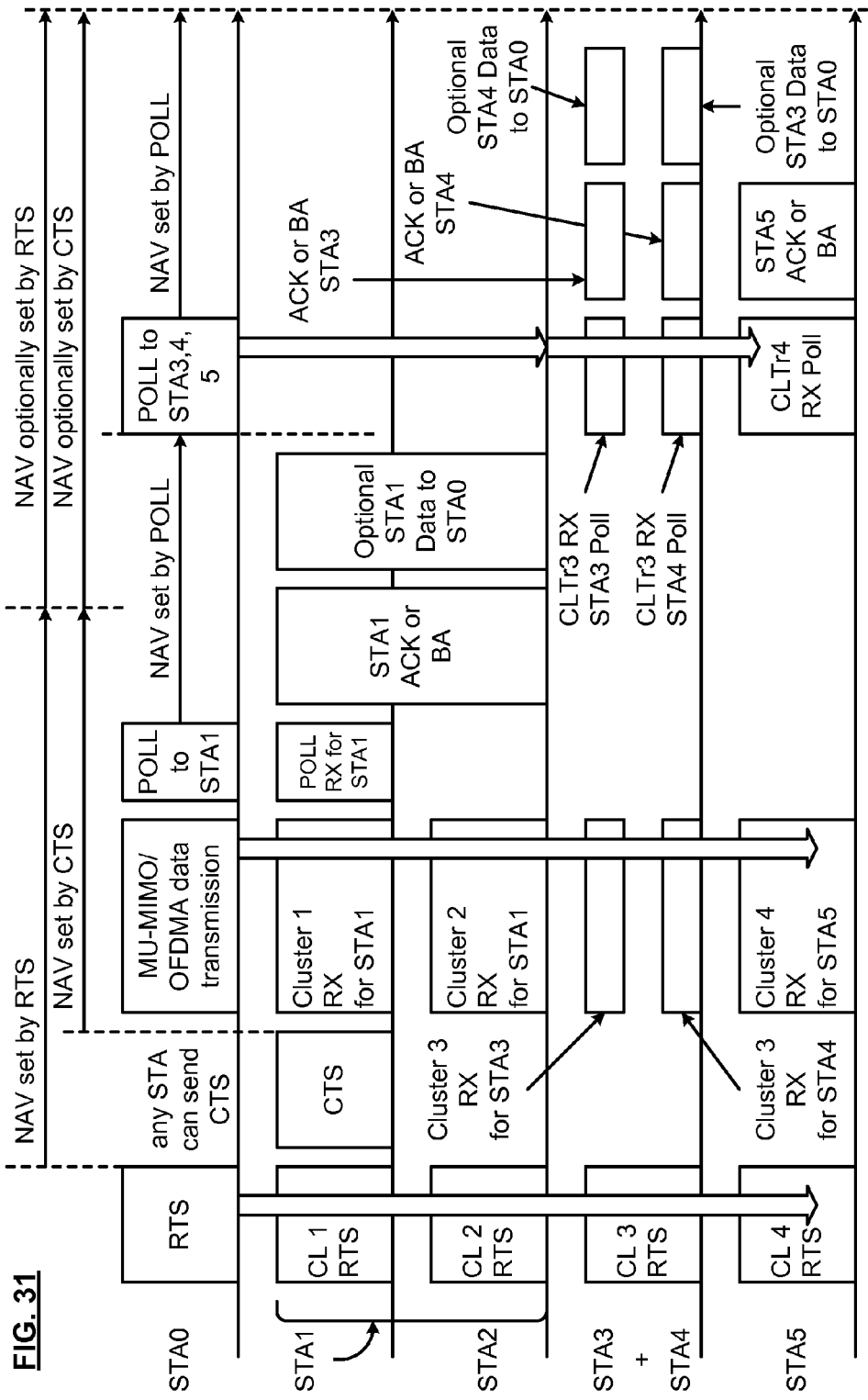
Figure 32:
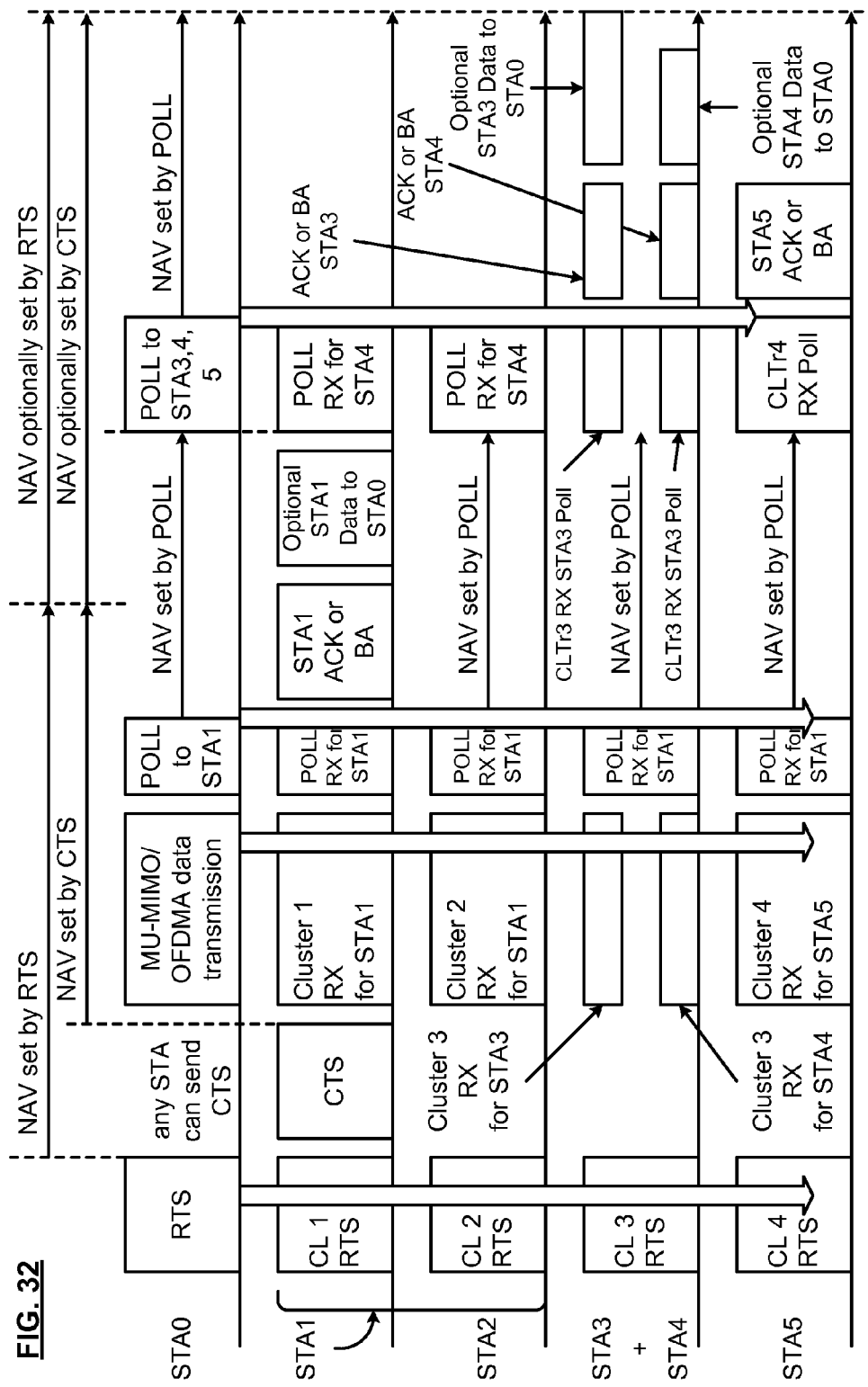

FIGS. 30, 31, and 32 are signal diagrams illustrating various embodiments of polled ACK operations of transmitting and receiving WLAN devices.

Figure 33:
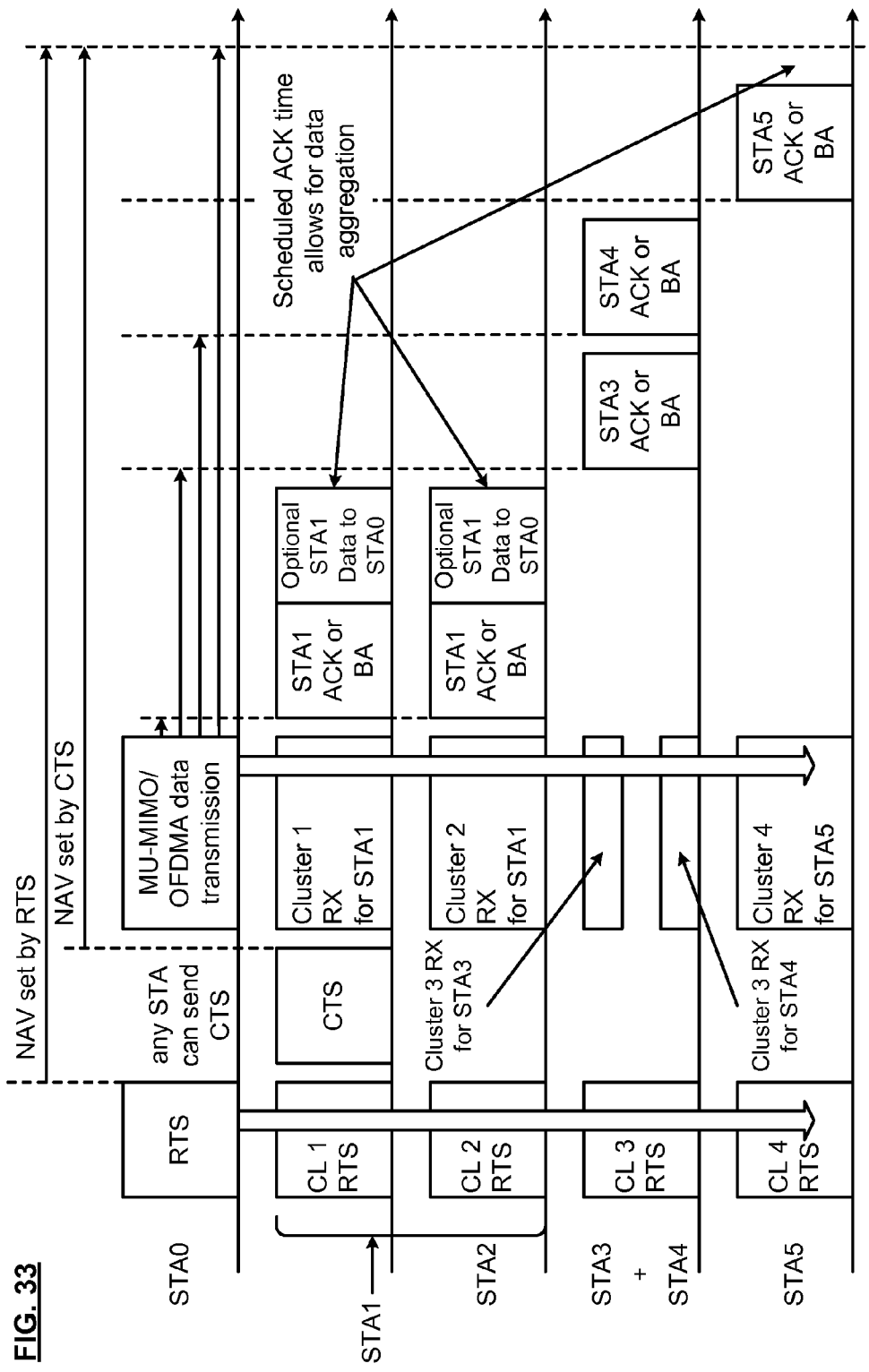
Figure 34:
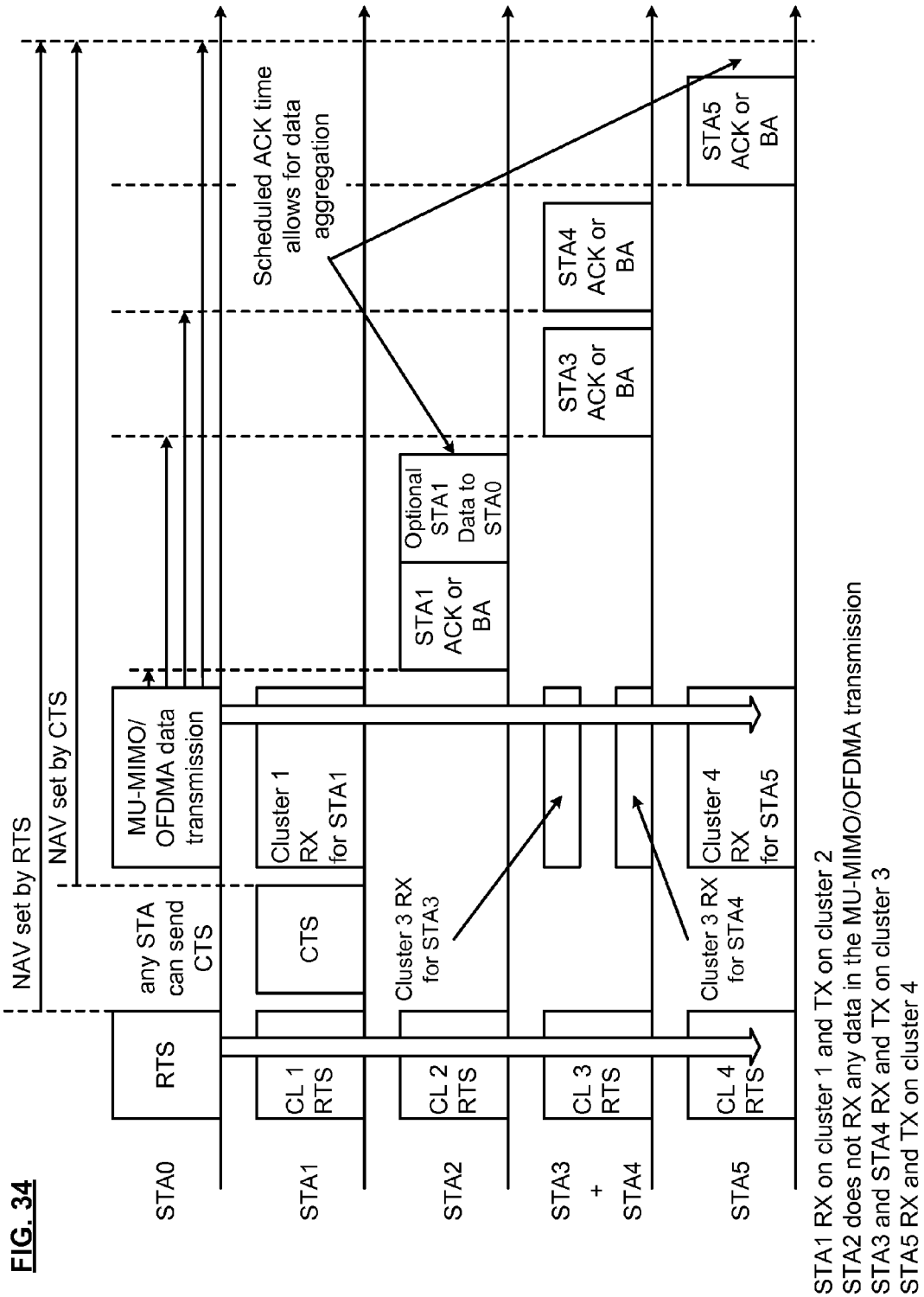

FIGS. 33 and 34 are signal diagrams illustrating various examples of reverse data aggregations ACK operations of transmitting and receiving WLAN devices.

DETAILED DESCRIPTION OF THE INVENTION

Figure 1:
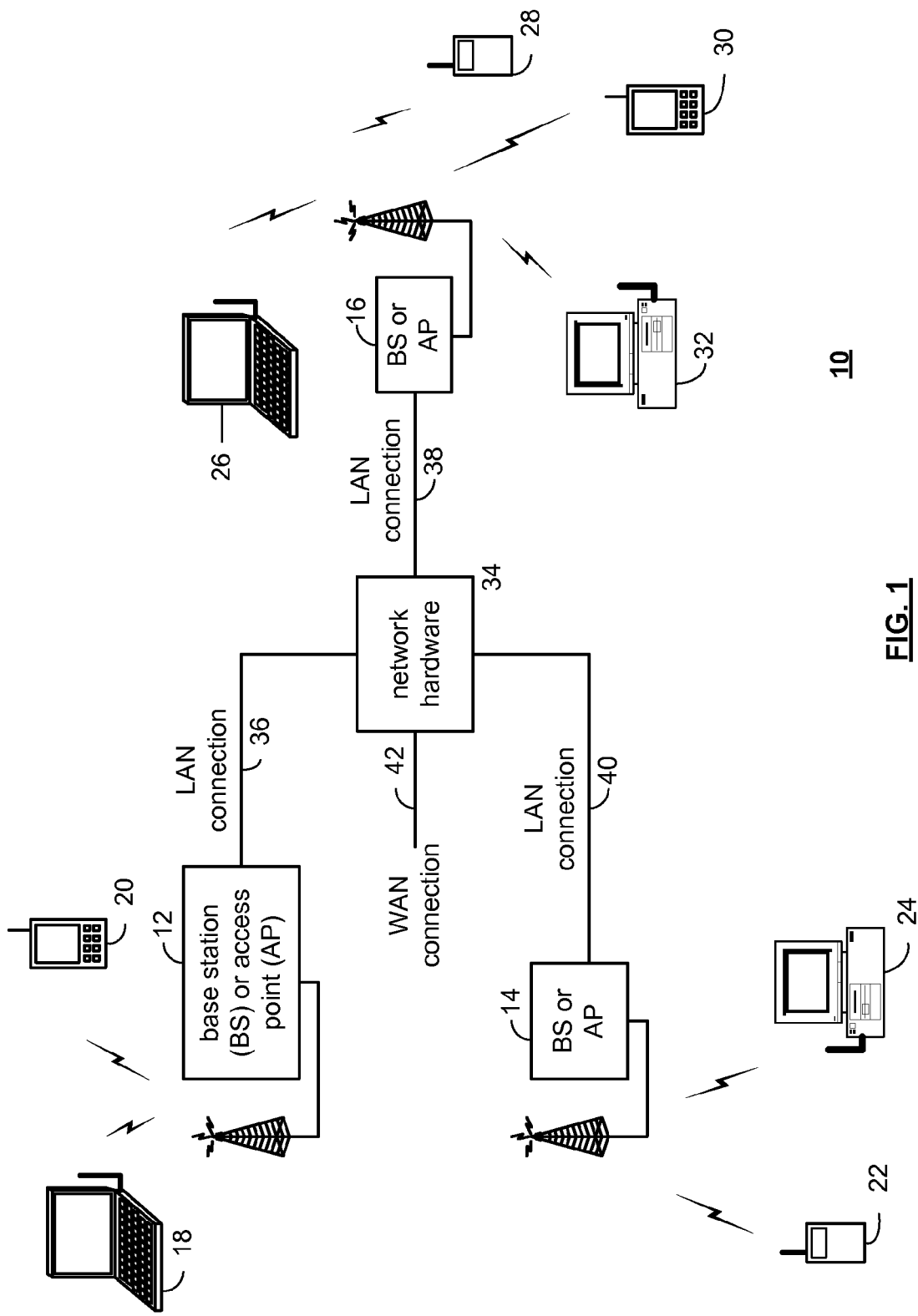
FIG. 1 is a diagram illustrating an embodiment of a wireless communication system.

FIG. 1 is a diagram illustrating an embodiment of a wireless communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of an embodiment of such wireless communication devices is described in greater detail with reference to FIG. 2.

The base stations (BSs) or access points (APs) 12-16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Typically, base stations are used for cellular telephone systems (e.g., advanced mobile phone services (AMPS), digital AMPS, global system for mobile communications (GSM), code division multiple access (CDMA), local multi-point distribution systems (LMDS), multi-channel-multi-point distribution systems (MMDS), Enhanced Data rates for GSM Evolution (EDGE), General Packet Radio Service (GPRS), high-speed downlink packet access (HSDPA), high-speed uplink packet access (HSUPA and/or variations thereof) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio. Such wireless communication device may operate in accordance with the various aspects of the invention as presented herein to enhance performance, reduce costs, reduce size, and/or enhance broadband applications.

Figure 2:
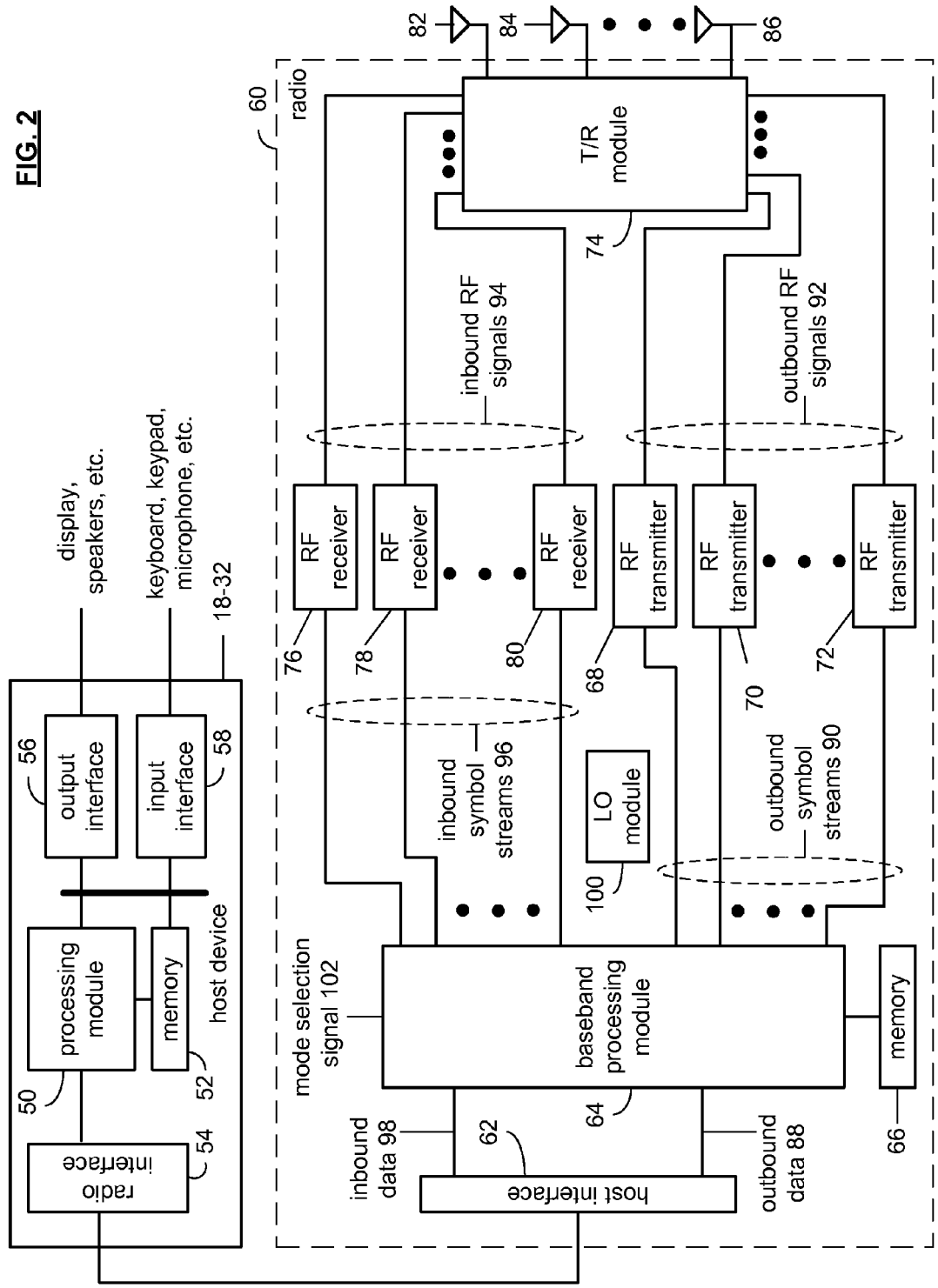
FIG. 2 is a diagram illustrating an embodiment of a wireless communication device.

FIG. 2 is a diagram illustrating an embodiment of a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component. For access points or base stations, the components are typically housed in a single structure.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 64, memory 66, a plurality of radio frequency (RF) transmitters 68-72, a transmit/receive (T/R) module 74, a plurality of antennae 82-86, a plurality of RF receivers 76-80, and a local oscillation module 100. The baseband processing module 64, in combination with operational instructions stored in memory 66, execute digital receiver functions and digital transmitter functions, respectively. The digital receiver functions, as will be described in greater detail with reference to FIG. 11B, include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions, as will be described in greater detail with reference to later Figures, include, but are not limited to, scrambling, encoding, interleaving, constellation mapping, modulation, inverse fast Fourier transform, cyclic prefix addition, space and time encoding, and/or digital baseband to IF conversion. The baseband processing modules 64 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 66 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 88 from the host device via the host interface 62. The baseband processing module 64 receives the outbound data 88 and, based on a mode selection signal 102, produces one or more outbound symbol streams 90. The mode selection signal 102 will indicate a particular mode as are illustrated in the mode selection tables, which appear at the end of the detailed discussion. For example, the mode selection signal 102, with reference to table 1 may indicate a frequency band of 2.4 GHz or 5 GHz, a channel bandwidth of 20 or 22 MHz (e.g., channels of 20 or 22 MHz width) and a maximum bit rate of 54 megabits-per-second. In other embodiments, the channel bandwidth may extend up to 1.28 GHz or wider with supported maximum bit rates extending to 1 gigabit-per-second or greater. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. As is further illustrated in table 1, a code rate is supplied as well as number of coded bits per subcarrier (NBPSC), coded bits per OFDM symbol (NCBPS), data bits per OFDM symbol (NDBPS).

The mode selection signal may also indicate a particular channelization for the corresponding mode which for the information in table 1 is illustrated in table 2. As shown, table 2 includes a channel number and corresponding center frequency. The mode select signal may further indicate a power spectral density mask value which for table 1 is illustrated in table 3. The mode select signal may alternatively indicate rates within table 4 that has a 5 GHz frequency band, 20 MHz channel bandwidth and a maximum bit rate of 54 megabits-per-second. If this is the particular mode select, the channelization is illustrated in table 5. As a further alternative, the mode select signal 102 may indicate a 2.4 GHz frequency band, 20 MHz channels and a maximum bit rate of 192 megabits-per-second as illustrated in table 6. In table 6, a number of antennae may be utilized to achieve the higher bit rates. In this instance, the mode select would further indicate the number of antennae to be utilized. Table 7 illustrates the channelization for the set-up of table 6. Table 8 illustrates yet another mode option where the frequency band is 2.4 GHz, the channel bandwidth is 20 MHz and the maximum bit rate is 192 megabits-per-second. The corresponding table 8 includes various bit rates ranging from 12 megabits-per-second to 216 megabits-per-second utilizing 2-4 antennae and a spatial time encoding rate as indicated. Table 9 illustrates the channelization for table 8. The mode select signal 102 may further indicate a particular operating mode as illustrated in table 10, which corresponds to a 5 GHz frequency band having 40 MHz frequency band having 40 MHz channels and a maximum bit rate of 486 megabits-per-second. As shown in table 10, the bit rate may range from 13.5 megabits-per-second to 486 megabits-per-second utilizing 1-4 antennae and a corresponding spatial time code rate. Table 10 further illustrates a particular modulation scheme code rate and NBPSC values. Table 11 provides the power spectral density mask for table 10 and table 12 provides the channelization for table 10.

It is of course noted that other types of channels, having different bandwidths, may be employed in other embodiments without departing from the scope and spirit of the invention. For example, various other channels such as those having 80 MHz, 120 MHz, and/or 160 MHz of bandwidth may alternatively be employed such as in accordance with IEEE Task Group ac (TGac VHTL6).

The baseband processing module 64, based on the mode selection signal 102 produces the one or more outbound symbol streams 90, as will be further described with reference to FIGS. 5-9 from the output data 88. For example, if the mode selection signal 102 indicates that a single transmit antenna is being utilized for the particular mode that has been selected, the baseband processing module 64 will produce a single outbound symbol stream 90. Alternatively, if the mode select signal indicates 2, 3 or 4 antennae, the baseband processing module 64 will produce 2, 3 or 4 outbound symbol streams 90 corresponding to the number of antennae from the output data 88.

Depending on the number of outbound streams 90 produced by the baseband module 64, a corresponding number of the RF transmitters 68-72 will be enabled to convert the outbound symbol streams 90 into outbound RF signals 92. The implementation of the RF transmitters 68-72 will be further described with reference to FIG. 3. The transmit/receive module 74 receives the outbound RF signals 92 and provides each outbound RF signal to a corresponding antenna 82-86.

When the radio 60 is in the receive mode, the transmit/receive module 74 receives one or more inbound RF signals via the antennae 82-86. The T/R module 74 provides the inbound RF signals 94 to one or more RF receivers 76-80. The RF receiver 76-80, which will be described in greater detail with reference to FIG. 4, converts the inbound RF signals 94 into a corresponding number of inbound symbol streams 96. The number of inbound symbol streams 96 will correspond to the particular mode in which the data was received (recall that the mode may be any one of the modes illustrated in tables 1-12). The baseband processing module 60 receives the inbound symbol streams 90 and converts them into inbound data 98, which is provided to the host device 18-32 via the host interface 62.

In one embodiment of radio 60 it includes a transmitter and a receiver. The transmitter may include a MAC module, a PLCP module, and a PMD module. The Medium Access Control (MAC) module, which may be implemented with the processing module 64, is operably coupled to convert a MAC Service Data Unit (MSDU) into a MAC Protocol Data Unit (MPDU) in accordance with a WLAN protocol. The Physical Layer Convergence Procedure (PLCP) Module, which may be implemented in the processing module 64, is operably coupled to convert the MPDU into a PLCP Protocol Data Unit (PPDU) in accordance with the WLAN protocol. The Physical Medium Dependent (PMD) module is operably coupled to convert the PPDU into a plurality of radio frequency (RF) signals in accordance with one of a plurality of operating modes of the WLAN protocol, wherein the plurality of operating modes includes multiple input and multiple output combinations.

An embodiment of the Physical Medium Dependent (PMD) module, which will be described in greater detail with reference to FIGS. 10A and 10B, includes an error protection module, a demultiplexing module, and a plurality of direction conversion modules. The error protection module, which may be implemented in the processing module 64, is operably coupled to restructure a PPDU (PLCP (Physical Layer Convergence Procedure) Protocol Data Unit) to reduce transmission errors producing error protected data. The demultiplexing module is operably coupled to divide the error protected data into a plurality of error protected data streams The plurality of direct conversion modules is operably coupled to convert the plurality of error protected data streams into a plurality of radio frequency (RF) signals.

As one of average skill in the art will appreciate, the wireless communication device of FIG. 2 may be implemented using one or more integrated circuits. For example, the host device may be implemented on one integrated circuit, the baseband processing module 64 and memory 66 may be implemented on a second integrated circuit, and the remaining components of the radio 60, less the antennae 82-86, may be implemented on a third integrated circuit. As an alternate example, the radio 60 may be implemented on a single integrated circuit. As yet another example, the processing module 50 of the host device and the baseband processing module 64 may be a common processing device implemented on a single integrated circuit. Further, the memory 52 and memory 66 may be implemented on a single integrated circuit and/or on the same integrated circuit as the common processing modules of processing module 50 and the baseband processing module 64.

Figure 3:
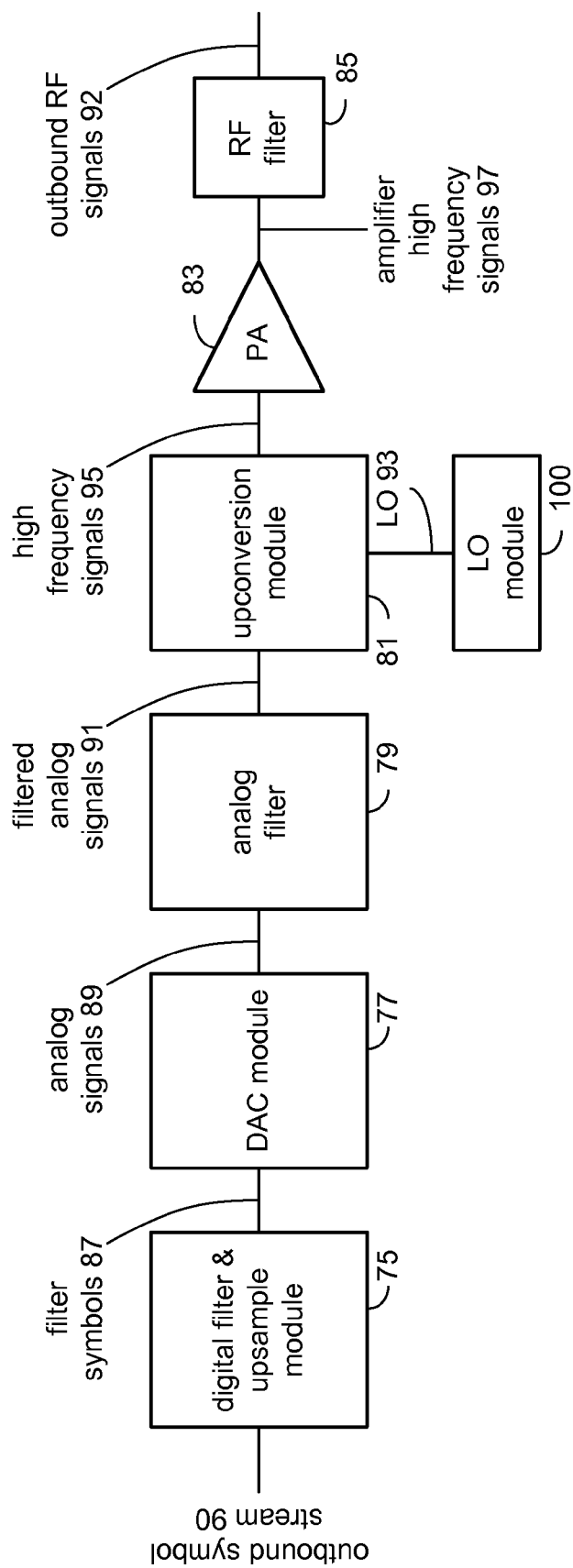
FIG. 3 is a diagram illustrating an embodiment of a radio frequency (RF) transmitter.

FIG. 3 is a diagram illustrating an embodiment of a radio frequency (RF) transmitter 68-72, or RF front-end, of the WLAN transmitter. The RF transmitter 68-72 includes a digital filter and up-sampling module 75, a digital-to-analog conversion module 77, an analog filter 79, and up-conversion module 81, a power amplifier 83 and a RF filter 85. The digital filter and up-sampling module 75 receives one of the outbound symbol streams 90 and digitally filters it and then up-samples the rate of the symbol streams to a desired rate to produce the filtered symbol streams 87. The digital-to-analog conversion module 77 converts the filtered symbols 87 into analog signals 89. The analog signals may include an in-phase component and a quadrature component.

The analog filter 79 filters the analog signals 89 to produce filtered analog signals 91. The up-conversion module 81, which may include a pair of mixers and a filter, mixes the filtered analog signals 91 with a local oscillation 93, which is produced by local oscillation module 100, to produce high frequency signals 95. The frequency of the high frequency signals 95 corresponds to the frequency of the RF signals 92.

The power amplifier 83 amplifies the high frequency signals 95 to produce amplified high frequency signals 97. The RF filter 85, which may be a high frequency band-pass filter, filters the amplified high frequency signals 97 to produce the desired output RF signals 92.

As one of average skill in the art will appreciate, each of the radio frequency transmitters 68-72 will include a similar architecture as illustrated in FIG. 3 and further include a shut-down mechanism such that when the particular radio frequency transmitter is not required, it is disabled in such a manner that it does not produce interfering signals and/or noise.

Figure 4:
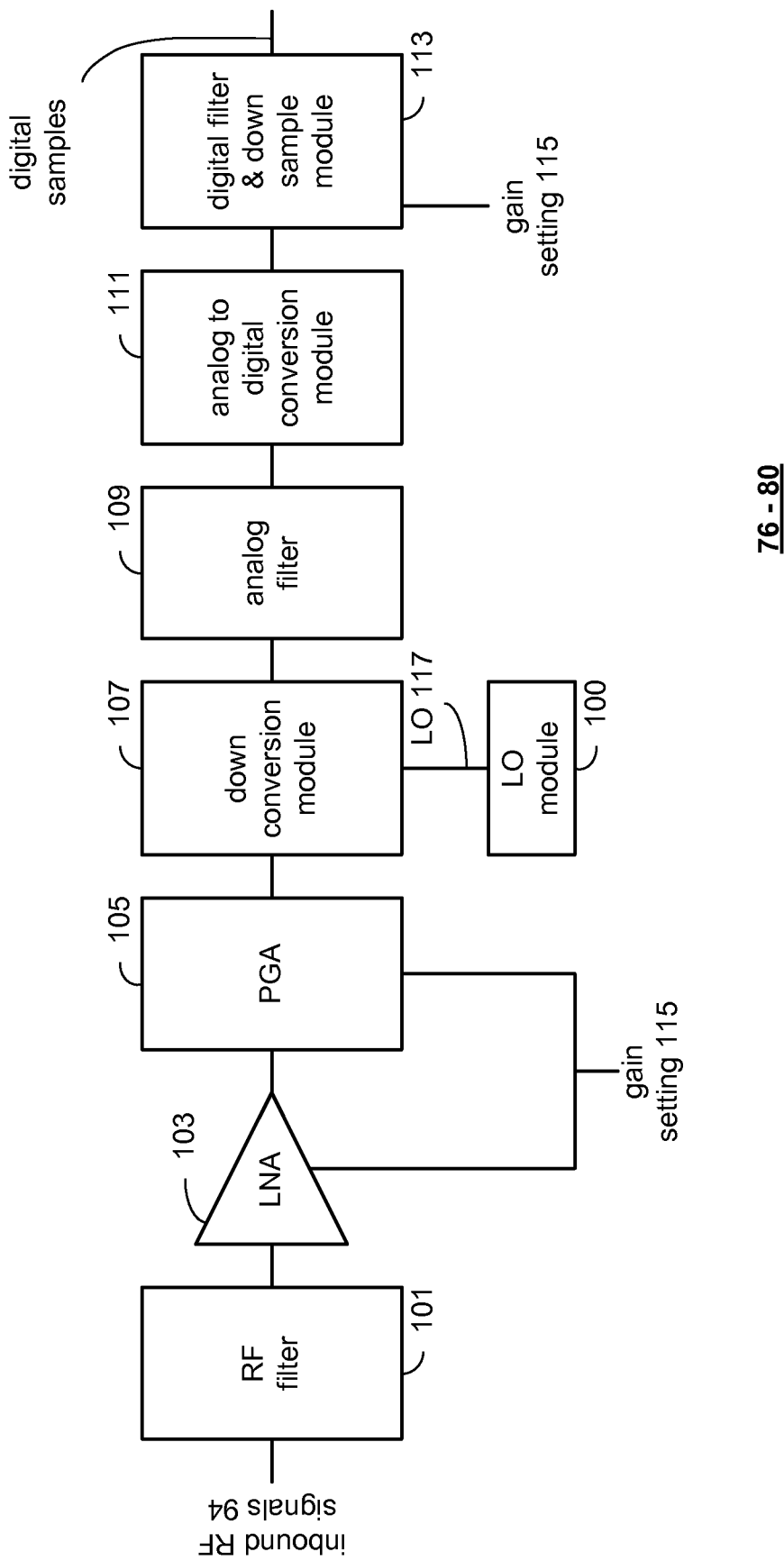
FIG. 4 is a diagram illustrating an embodiment of an RF receiver.

FIG. 4 is a diagram illustrating an embodiment of an RF receiver. This may depict any one of the RF receivers 76-80. In this embodiment, each of the RF receivers 76-80 includes an RF filter 101, a low noise amplifier (LNA) 103, a programmable gain amplifier (PGA) 105, a down-conversion module 107, an analog filter 109, an analog-to-digital conversion module 111 and a digital filter and down-sampling module 113. The RF filter 101, which may be a high frequency bandpass filter, receives the inbound RF signals 94 and filters them to produce filtered inbound RF signals. The low noise amplifier 103 amplifies the filtered inbound RF signals 94 based on a gain setting and provides the amplified signals to the programmable gain amplifier 105. The programmable gain amplifier further amplifies the inbound RF signals 94 before providing them to the down-conversion module 107.

The down-conversion module 107 includes a pair of mixers, a summation module, and a filter to mix the inbound RF signals with a local oscillation (LO) that is provided by the local oscillation module to produce analog baseband signals. The analog filter 109 filters the analog baseband signals and provides them to the analog-to-digital conversion module 111 which converts them into a digital signal. The digital filter and down-sampling module 113 filters the digital signals and then adjusts the sampling rate to produce the digital samples (corresponding to the inbound symbol streams 96).

Figure 5:
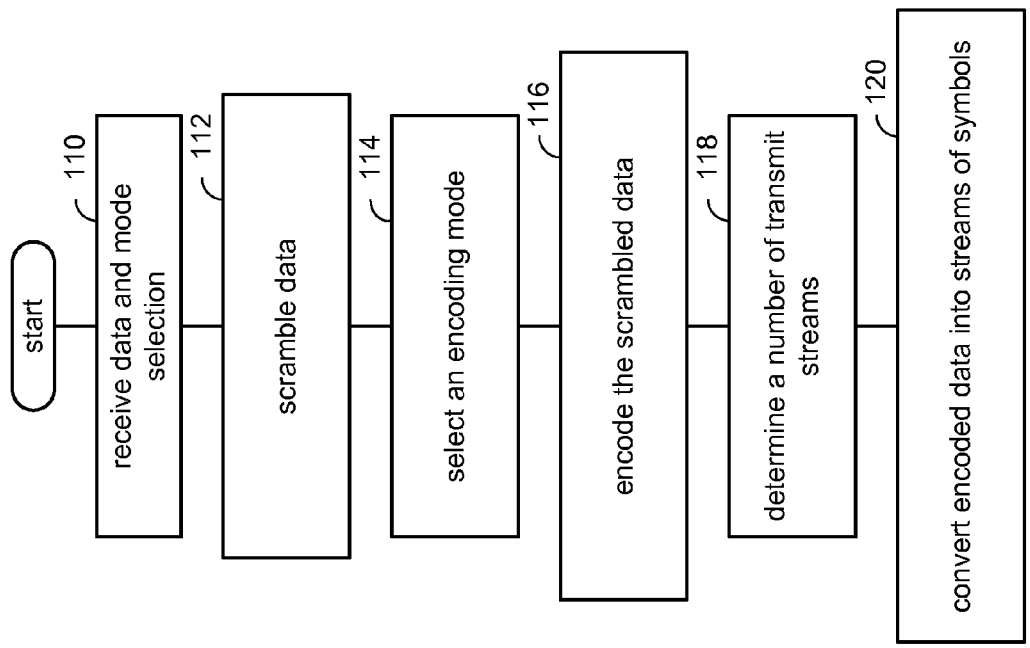
FIG. 5 is a diagram illustrating an embodiment of a method for baseband processing of data.

FIG. 5 is a diagram illustrating an embodiment of a method for baseband processing of data. This diagram shows a method for converting outbound data 88 into one or more outbound symbol streams 90 by the baseband processing module 64. The process begins at Step 110 where the baseband processing module receives the outbound data 88 and a mode selection signal 102. The mode selection signal may indicate any one of the various modes of operation as indicated in tables 1-12. The process then proceeds to Step 112 where the baseband processing module scrambles the data in accordance with a pseudo random sequence to produce scrambled data. Note that the pseudo random sequence may be generated from a feedback shift register with the generator polynomial of $S(x)=x^7+x^4+1$.

The process then proceeds to Step 114 where the baseband processing module selects one of a plurality of encoding modes based on the mode selection signal. The process then proceeds to Step 116 where the baseband processing module encodes the scrambled data in accordance with a selected encoding mode to produce encoded data. The encoding may be done utilizing any one or more a variety of coding schemes (e.g., convolutional coding, Reed-Solomon (RS) coding, turbo coding, turbo trellis coded modulation (TTCM) coding, LDPC (Low Density Parity Check) coding, etc.).

The process then proceeds to Step 118 where the baseband processing module determines a number of transmit streams based on the mode select signal. For example, the mode select signal will select a particular mode which indicates that 1, 2, 3, 4 or more antennae may be utilized for the transmission. Accordingly, the number of transmit streams will correspond to the number of antennae indicated by the mode select signal. The process then proceeds to Step 120 where the baseband processing module converts the encoded data into streams of symbols in accordance with the number of transmit streams in the mode select signal. This step will be described in greater detail with reference to FIG. 6.

Figure 6:
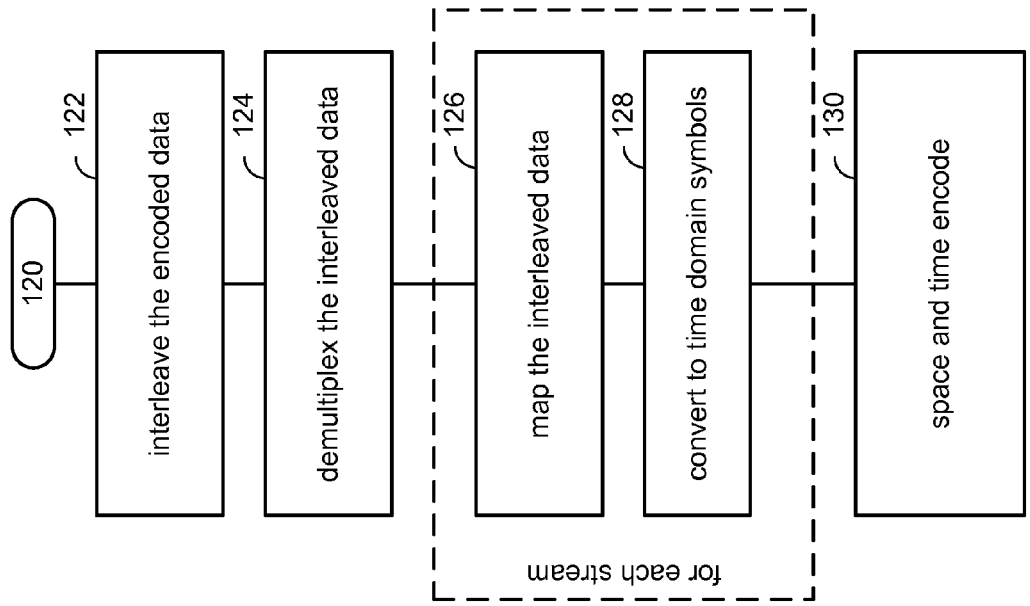
FIG. 6 is a diagram illustrating an embodiment of a method that further defines Step 120 of FIG. 5.

FIG. 6 is a diagram illustrating an embodiment of a method that further defines Step 120 of FIG. 5. This diagram shows a method performed by the baseband processing module to convert the encoded data into streams of symbols in accordance with the number of transmit streams and the mode select signal. Such processing begins at Step 122 where the baseband processing module interleaves the encoded data over multiple symbols and subcarriers of a channel to produce interleaved data. In general, the interleaving process is designed to spread the encoded data over multiple symbols and transmit streams. This allows improved detection and error correction capability at the receiver. In one embodiment, the interleaving process will follow the IEEE 802.11(a) or (g) standard for backward compatible modes. For higher performance modes (e.g., IEEE 802.11(n), the interleaving will also be done over multiple transmit paths or streams.

The process then proceeds to Step 124 where the baseband processing module demultiplexes the interleaved data into a number of parallel streams of interleaved data. The number of parallel streams corresponds to the number of transmit streams, which in turn corresponds to the number of antennae indicated by the particular mode being utilized. The process then continues to Steps 126 and 128, where for each of the parallel streams of interleaved data, the baseband processing module maps the interleaved data into a quadrature amplitude modulated (QAM) symbol to produce frequency domain symbols at Step 126. At Step 128, the baseband processing module converts the frequency domain symbols into time domain symbols, which may be done utilizing an inverse fast Fourier transform. The conversion of the frequency domain symbols into the time domain symbols may further include adding a cyclic prefix to allow removal of intersymbol interference at the receiver. Note that the length of the inverse fast Fourier transform and cyclic prefix are defined in the mode tables of tables 1-12. In general, a 64-point inverse fast Fourier transform is employed for 20 MHz channels and 128-point inverse fast Fourier transform is employed for 40 MHz channels.

The process then proceeds to Step 130 where the baseband processing module space and time encodes the time domain symbols for each of the parallel streams of interleaved data to produce the streams of symbols. In one embodiment, the space and time encoding may be done by space and time encoding the time domain symbols of the parallel streams of interleaved data into a corresponding number of streams of symbols utilizing an encoding matrix. Alternatively, the space and time encoding may be done by space and time encoding the time domain symbols of M-parallel streams of interleaved data into P-streams of symbols utilizing the encoding matrix, where P=2M. In one embodiment the encoding matrix may comprise a form of:

$$\begin{bmatrix} C_1 & C_2 & C_3 & C_4 & \ldots & C_{2M-1} & C_{2M} \\ -C_2^* & C_1^* & -C_4^* & C_3^* & \ldots & -C_{2M}^* & C_{2M-1}^* \end{bmatrix}$$

The number of rows of the encoding matrix corresponds to M and the number of columns of the encoding matrix corresponds to P. The particular symbol values of the constants within the encoding matrix may be real or imaginary numbers.

FIGS. 7-9 are diagrams illustrating various embodiments for encoding the scrambled data.

FIG. 7 is a diagram of one method that may be utilized by the baseband processing module to encode the scrambled data at Step 116 of FIG. 5. In this method, the encoding of FIG. 7 may include an optional Step 144 where the baseband processing module may optionally perform encoding with an outer Reed-Solomon (RS) code to produce RS encoded data. It is noted that Step 144 may be conducted in parallel with Step 140 described below.

Also, the process continues at Step 140 where the baseband processing module performs a convolutional encoding with a 64 state code and generator polynomials of $G_0=133_8$ and $G_1=171_8$ on the scrambled data (that may or may not have undergone RS encoding) to produce convolutional encoded data. The process then proceeds to Step 142 where the baseband processing module punctures the convolutional encoded data at one of a plurality of rates in accordance with the mode selection signal to produce the encoded data. Note that the puncture rates may include ½, ⅔ and/or ¾, or any rate as specified in tables 1-12. Note that, for a particular, mode, the rate may be selected for backward compatibility with IEEE 802.11(a), IEEE 802.11(g), or IEEE 802.11(n) rate requirements.

FIG. 8 is a diagram of another encoding method that may be utilized by the baseband processing module to encode the scrambled data at Step 116 of FIG. 5. In this embodiment, the encoding of FIG. 8 may include an optional Step 148 where the baseband processing module may optionally perform encoding with an outer RS code to produce RS encoded data. It is noted that Step 148 may be conducted in parallel with Step 146 described below.

The method then continues at Step 146 where the baseband processing module encodes the scrambled data (that may or may not have undergone RS encoding) in accordance with a complimentary code keying (CCK) code to produce the encoded data. This may be done in accordance with IEEE 802.11(b) specifications, IEEE 802.11(g), and/or IEEE 802.11(n) specifications.

FIG. 9 is a diagram of yet another method for encoding the scrambled data at Step 116, which may be performed by the baseband processing module. In this embodiment, the encoding of FIG. 9 may include an optional Step 154 where the baseband processing module may optionally perform encoding with an outer RS code to produce RS encoded data.

Then, in some embodiments, the process continues at Step 150 where the baseband processing module performs LDPC (Low Density Parity Check) coding on the scrambled data (that may or may not have undergone RS encoding) to produce LDPC coded bits. Alternatively, the Step 150 may operate by performing convolutional encoding with a 256 state code and generator polynomials of $G_0=561_8$ and $G_1=753_8$ on the scrambled data the scrambled data (that may or may not have undergone RS encoding) to produce convolutional encoded data. The process then proceeds to Step 152 where the baseband processing module punctures the convolutional encoded data at one of the plurality of rates in accordance with a mode selection signal to produce encoded data. Note that the puncture rate is indicated in the tables 1-12 for the corresponding mode.

The encoding of FIG. 9 may further include the optional Step 154 where the baseband processing module combines the convolutional encoding with an outer Reed Solomon code to produce the convolutional encoded data.

Figure 10A:
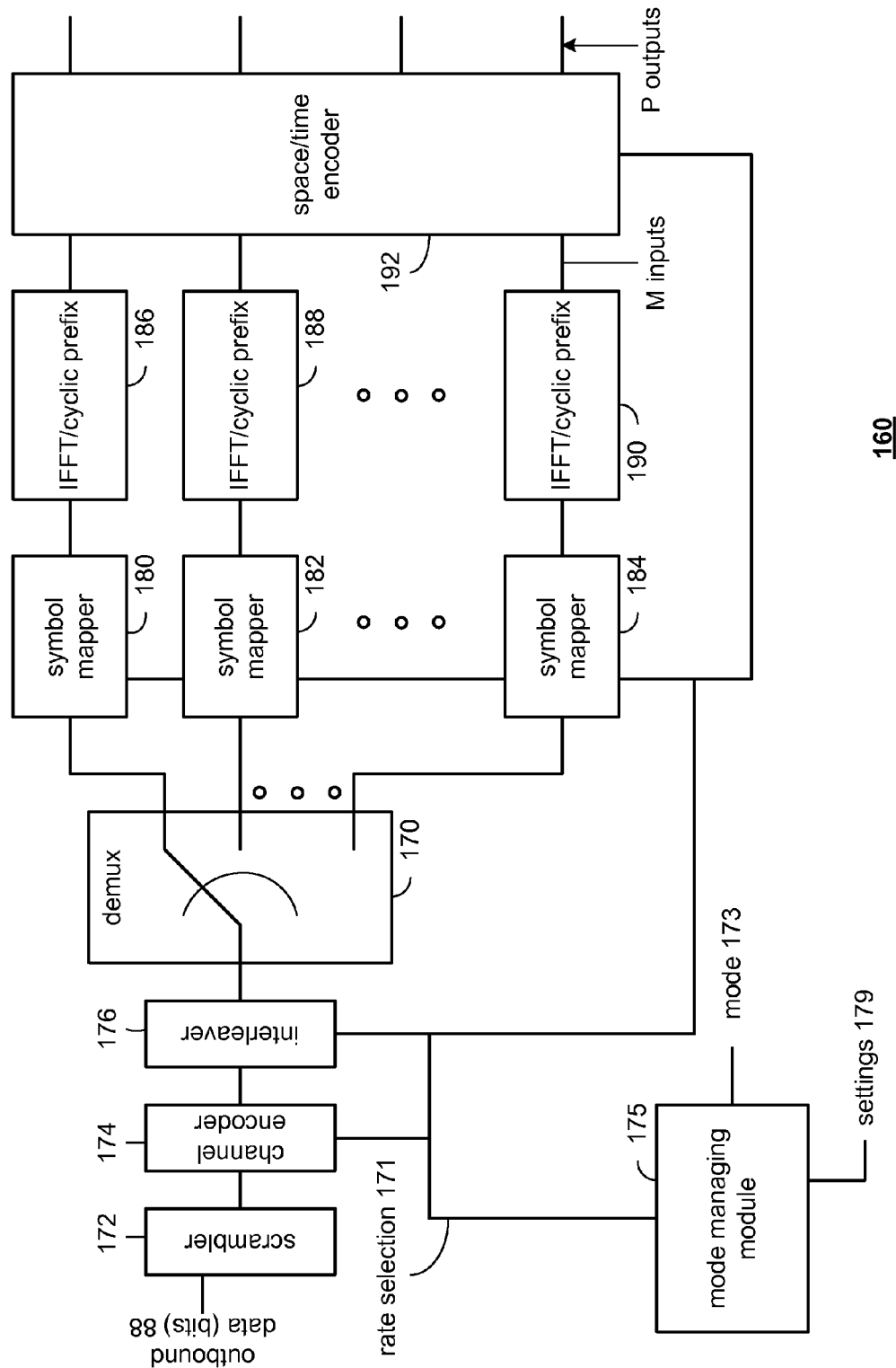
FIGS. 10A and 10B are diagrams illustrating embodiments of a radio transmitter.
Figure 10B:
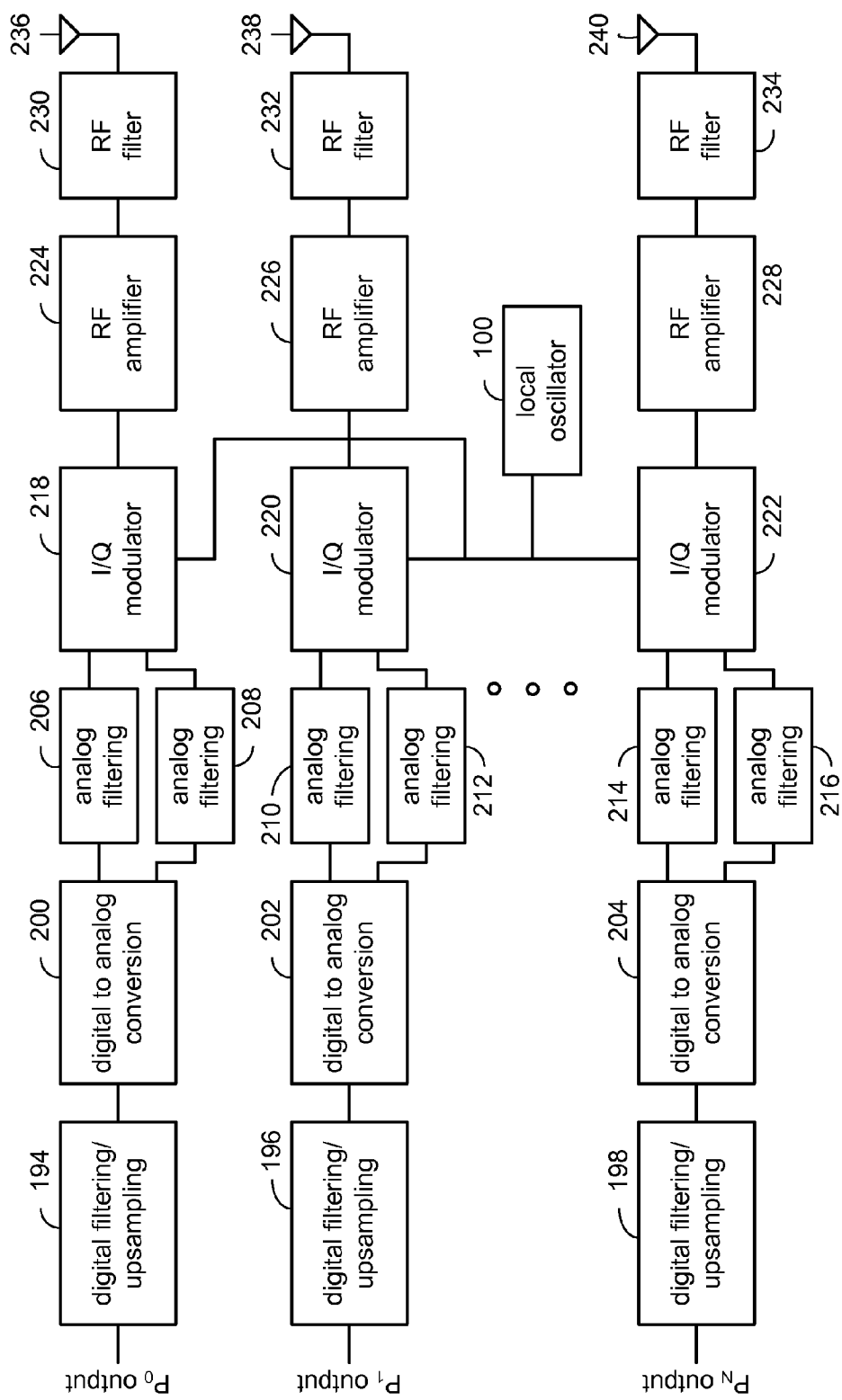

FIGS. 10A and 10B are diagrams illustrating embodiments of a radio transmitter. This may involve the PMD module of a WLAN transmitter. In FIG. 10A, the baseband processing is shown to include a scrambler 172, channel encoder 174, interleaver 176, demultiplexer 178, a plurality of symbol mappers 180-184, a plurality of inverse fast Fourier transform (IFFT)/cyclic prefix addition modules 186-190 and a space/time encoder 192. The baseband portion of the transmitter may further include a mode manager module 175 that receives the mode selection signal 173 and produces settings 179 for the radio transmitter portion and produces the rate selection 171 for the baseband portion. In this embodiment, the scrambler 172, the channel encoder 174, and the interleave 176 comprise an error protection module. The symbol mappers 180-184, the plurality of IFFT/cyclic prefix modules 186-190, the space time encoder 192 comprise a portion of the digital baseband processing module.

In operations, the scrambler 172 adds (e.g., in a Galois Finite Field (GF2)) a pseudo random sequence to the outbound data bits 88 to make the data appear random. A pseudo random sequence may be generated from a feedback shift register with the generator polynomial of $S(x)=x^7+x^4+1$ to produce scrambled data. The channel encoder 174 receives the scrambled data and generates a new sequence of bits with redundancy. This will enable improved detection at the receiver. The channel encoder 174 may operate in one of a plurality of modes. For example, for backward compatibility with IEEE 802.11(a) and IEEE 802.11(g), the channel encoder has the form of a rate ½ convolutional encoder with 64 states and a generator polynomials of $G_0=133_8$ and $G_1=171_8$. The output of the convolutional encoder may be punctured to rates of ½, ⅔, and ¾ according to the specified rate tables (e.g., tables 1-12). For backward compatibility with IEEE 802.11(b) and the CCK modes of IEEE 802.11(g), the channel encoder has the form of a CCK code as defined in IEEE 802.11(b). For higher data rates (such as those illustrated in tables 6, 8 and 10), the channel encoder may use the same convolution encoding as described above or it may use a more powerful code, including a convolutional code with more states, any one or more of the various types of error correction codes (ECCs) mentioned above (e.g., RS, LDPC, turbo, TTCM, etc.) a parallel concatenated (turbo) code and/or a low density parity check (LDPC) block code. Further, any one of these codes may be combined with an outer Reed Solomon code. Based on a balancing of performance, backward compatibility and low latency, one or more of these codes may be optimal. Note that the concatenated turbo encoding and low density parity check will be described in greater detail with reference to subsequent Figures.

The interleaver 176 receives the encoded data and spreads it over multiple symbols and transmit streams. This allows improved detection and error correction capabilities at the receiver. In one embodiment, the interleaver 176 will follow the IEEE 802.11(a) or (g) standard in the backward compatible modes. For higher performance modes (e.g., such as those illustrated in tables 6, 8 and 10), the interleaver will interleave data over multiple transmit streams. The demultiplexer 178 converts the serial interleave stream from interleaver 176 into M-parallel streams for transmission.

Each symbol mapper 180-184 receives a corresponding one of the M-parallel paths of data from the demultiplexer. Each symbol mapper 180-182 lock maps bit streams to quadrature amplitude modulated QAM symbols (e.g., BPSK, QPSK, 16 QAM, 64 QAM, 256 QAM, et cetera) according to the rate tables (e.g., tables 1-12). For IEEE 802.11(a) backward compatibility, double Gray coding may be used.

The map symbols produced by each of the symbol mappers 180-184 are provided to the IFFT/cyclic prefix addition modules 186-190, which performs frequency domain to time domain conversions and adds a prefix, which allows removal of inter-symbol interference at the receiver. Note that the length of the IFFT and cyclic prefix are defined in the mode tables of tables 1-12. In general, a 64-point IFFT will be used for 20 MHz channels and 128-point IFFT will be used for 40 MHz channels.

The space/time encoder 192 receives the M-parallel paths of time domain symbols and converts them into P-output symbols. In one embodiment, the number of M-input paths will equal the number of P-output paths. In another embodiment, the number of output paths P will equal 2M paths. For each of the paths, the space/time encoder multiples the input symbols with an encoding matrix that has the form of $$\begin{bmatrix} c_1 & c_2 & c_3 & c_4 & \ldots & c_{2M-1} & c_{2M} \\ -c_2^* & c_1^* & -c_4^* & c_3^* & \ldots & -c_{2M}^* & c_{2M-1}^* \end{bmatrix}.$$

The rows of the encoding matrix correspond to the number of input paths and the columns correspond to the number of output paths.

FIG. 10B illustrates the radio portion of the transmitter that includes a plurality of digital filter/up-sampling modules 194-198, digital-to-analog conversion modules 200-204, analog filters 206-216, I/Q modulators 218-222, RF amplifiers 224-228, RF filters 230-234 and antennae 236-240. The P-outputs from the space/time encoder 192 are received by respective digital filtering/up-sampling modules 194-198. In one embodiment, the digital filters/up sampling modules 194-198 are part of the digital baseband processing module and the remaining components comprise the plurality of RF front-ends. In such an embodiment, the digital baseband processing module and the RF front end comprise a direct conversion module.

In operation, the number of radio paths that are active correspond to the number of P-outputs. For example, if only one P-output path is generated, only one of the radio transmitter paths will be active. As one of average skill in the art will appreciate, the number of output paths may range from one to any desired number.

The digital filtering/up-sampling modules 194-198 filter the corresponding symbols and adjust the sampling rates to correspond with the desired sampling rates of the digital-to-analog conversion modules 200-204. The digital-to-analog conversion modules 200-204 convert the digital filtered and up-sampled signals into corresponding in-phase and quadrature analog signals. The analog filters 208-214 filter the corresponding in-phase and/or quadrature components of the analog signals, and provide the filtered signals to the corresponding I/Q modulators 218-222. The I/Q modulators 218-222 based on a local oscillation, which is produced by a local oscillator 100, up-converts the I/Q signals into radio frequency signals.

The RF amplifiers 224-228 amplify the RF signals which are then subsequently filtered via RF filters 230-234 before being transmitted via antennae 236-240.

Figure 11A:
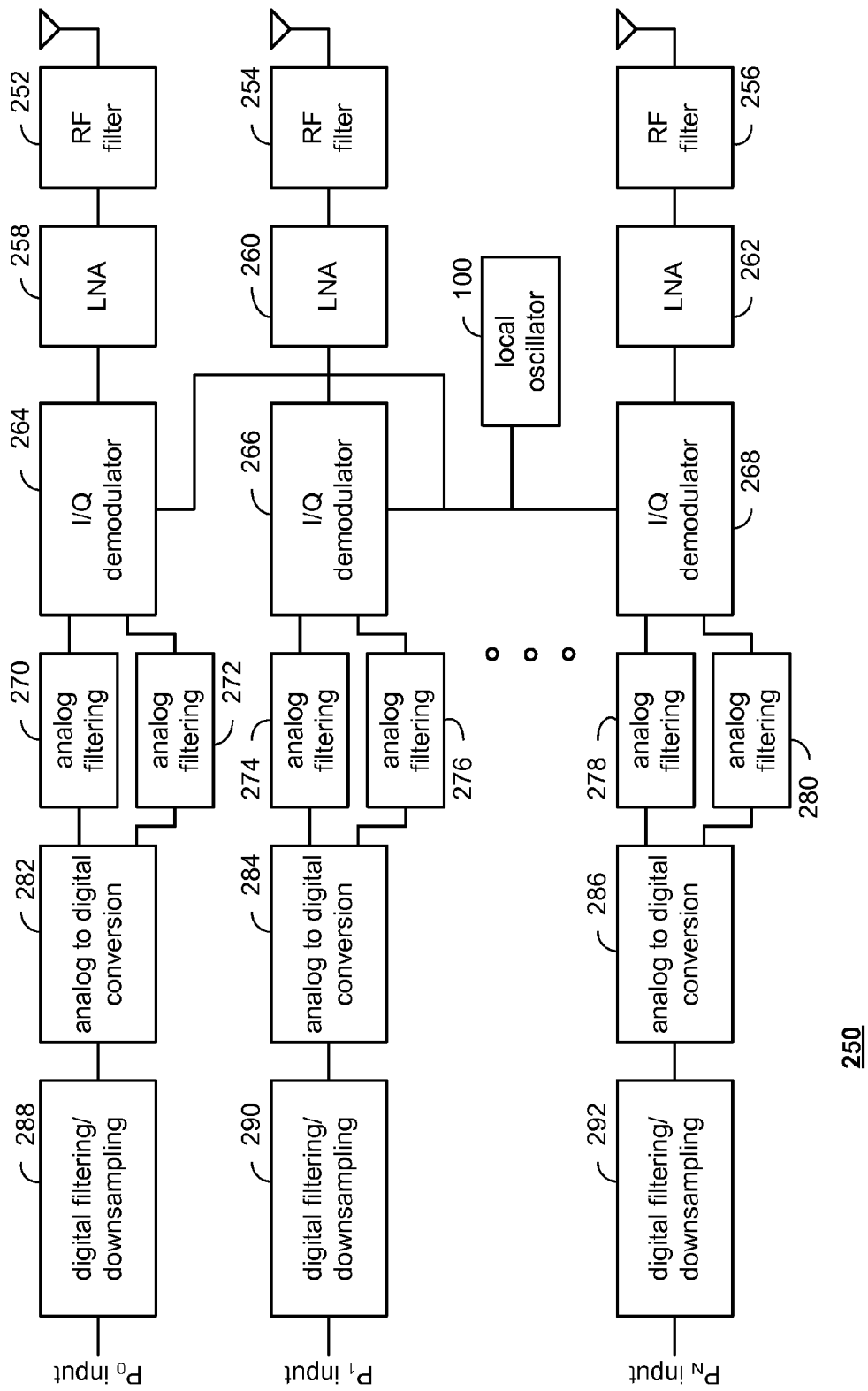
FIGS. 11A and 11B are diagrams illustrating embodiments of a radio receiver.
Figure 11B:
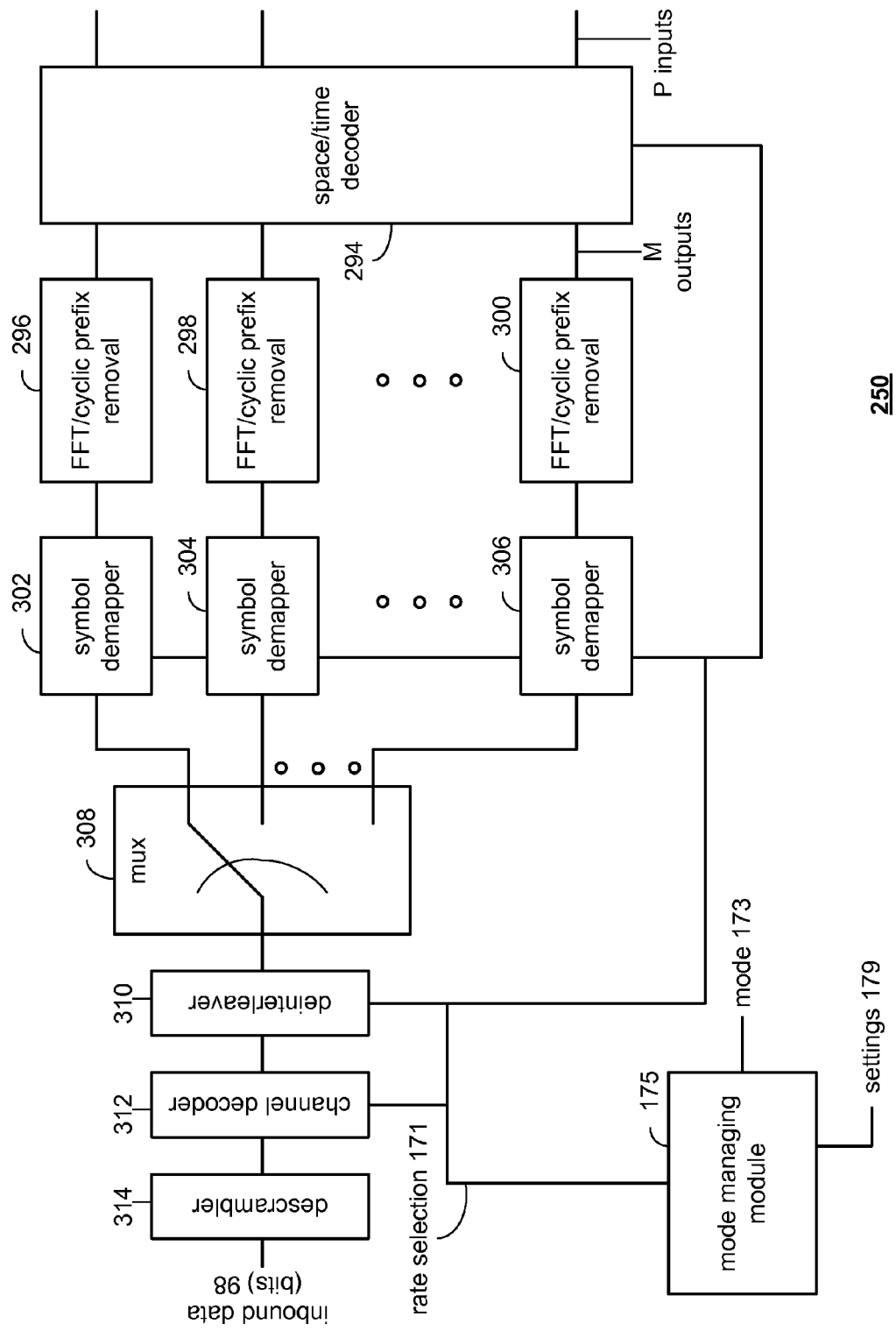

FIGS. 11A and 11B are diagrams illustrating embodiments of a radio receiver. These diagrams illustrate a schematic block diagram of another embodiment of a receiver. FIG. 11A illustrates the analog portion of the receiver which includes a plurality of receiver paths. Each receiver path includes an antenna, RF filters 252-256, low noise amplifiers 258-260, I/Q demodulators 264-268, analog filters 270-280, analog-to-digital converters 282-286 and digital filters and down-sampling modules 288-290.

In operation, the antennae receive inbound RF signals, which are band-pass filtered via the RF filters 252-256. The corresponding low noise amplifiers 258-260 amplify the filtered signals and provide them to the corresponding I/Q demodulators 264-268. The I/Q demodulators 264-268, based on a local oscillation, which is produced by local oscillator 100, down-converts the RF signals into baseband in-phase and quadrature analog signals.

The corresponding analog filters 270-280 filter the in-phase and quadrature analog components, respectively. The analog-to-digital converters 282-286 convert the in-phase and quadrature analog signals into a digital signal. The digital filtering and down-sampling modules 288-290 filter the digital signals and adjust the sampling rate to correspond to the rate of the baseband processing, which will be described in FIG. 11B.

FIG. 11B illustrates the baseband processing of a receiver. The baseband processing includes a space/time decoder 294, a plurality of fast Fourier transform (FFT)/cyclic prefix removal modules 296-300, a plurality of symbol demapping modules 302-306, a multiplexer 308, a deinterleaver 310, a channel decoder 312, and a descramble module 314. The baseband processing module may further include a mode managing module 175, which produces rate selections 171 and settings 179 based on mode selections 173. The space/time decoding module 294, which performs the inverse function of space/time encoder 192, receives P-inputs from the receiver paths and produce M-output paths. The M-output paths are processed via the FFT/cyclic prefix removal modules 296-300 which perform the inverse function of the IFFT/cyclic prefix addition modules 186-190 to produce frequency domain symbols.

The symbol demapping modules 302-306 convert the frequency domain symbols into data utilizing an inverse process of the symbol mappers 180-184. The multiplexer 308 combines the demapped symbol streams into a single path.

The deinterleaver 310 deinterleaves the single path utilizing an inverse function of the function performed by interleaver 176. The deinterleaved data is then provided to the channel decoder 312 which performs the inverse function of channel encoder 174. The descrambler 314 receives the decoded data and performs the inverse function of scrambler 172 to produce the inbound data 98.

Figure 12:
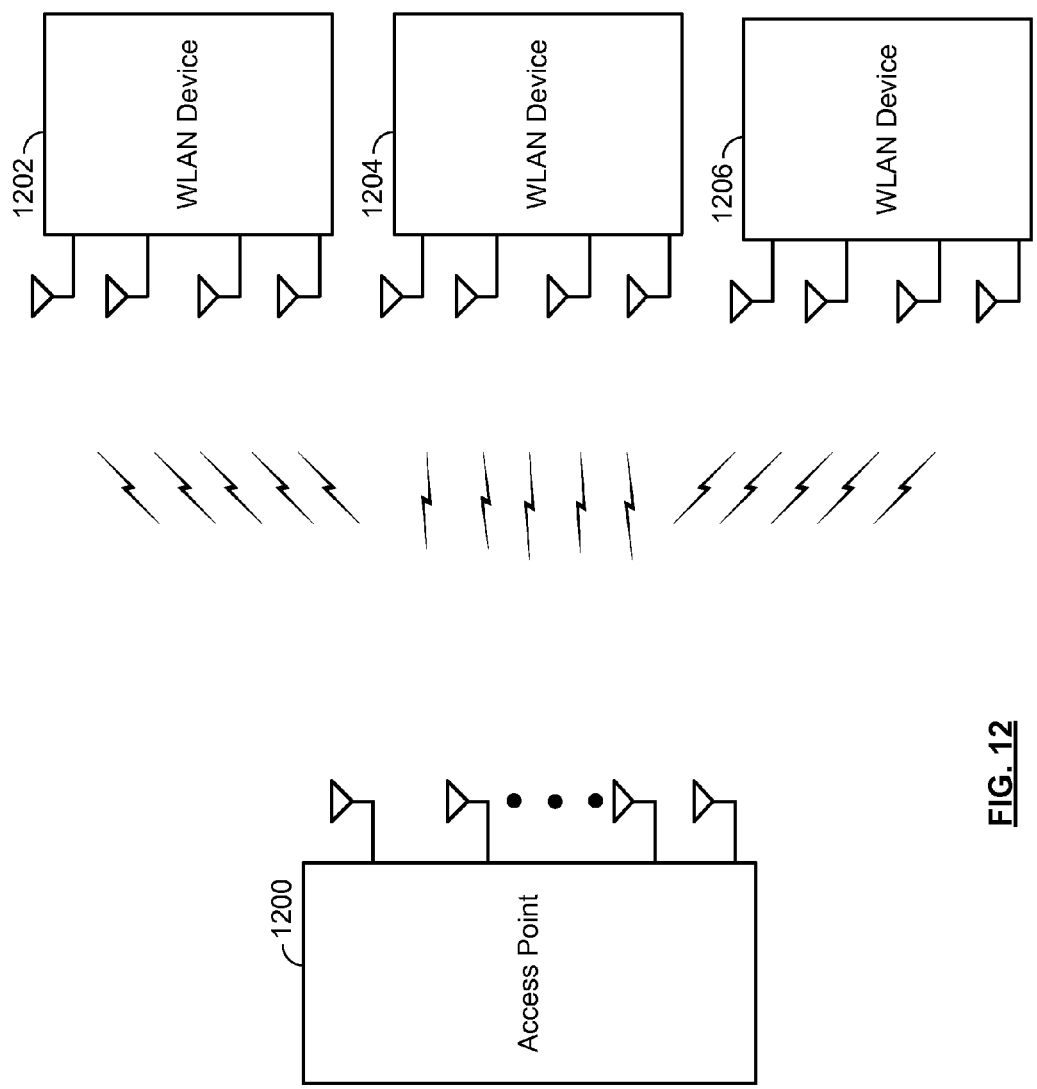
FIG. 12 is a diagram illustrating an embodiment of an access point (AP) and multiple wireless local area network (WLAN) devices operating according to one or more various aspects and/or embodiments of the invention.

FIG. 12 is a diagram illustrating an embodiment of an access point (AP) and multiple wireless local area network (WLAN) devices operating according to one or more various aspects and/or embodiments of the invention. The AP point 1200 may compatible with any number of communication protocols and/or standards, e.g., IEEE 802.11(a), IEEE 802.11(b), IEEE 802.11(g), IEEE 802.11(n), as well as in accordance with various aspects of invention. According to certain aspects of the present invention, the AP supports backwards compatibility with prior versions of the IEEE 802.11x standards as well. According to other aspects of the present invention, the AP 1200 supports communications with the WLAN devices 1202, 1204, and 1206 with channel bandwidths, MIMO dimensions, and at data throughput rates unsupported by the prior IEEE 802.11x operating standards. For example, the access point 1200 and WLAN devices 1202, 1204, and 1206 may support channel bandwidths from those of prior version devices and from 40 MHz to 1.28 GHz and above. The access point 1200 and WLAN devices 1202, 1204, and 1206 support MIMO dimensions to 4×4 and greater. With these characteristics, the access point 1200 and WLAN devices 1202, 1204, and 1206 may support data throughput rates to 1 GHz and above.

The AP 1200 supports simultaneous communications with more than one of the WLAN devices 1202, 1204, and 1206. Simultaneous communications may be serviced via OFDM tone allocations (e.g., certain number of OFDM tones in a given cluster), MIMO dimension multiplexing, or via other techniques. With some simultaneous communications, the AP 1200 may allocate one or more of the multiple antennae thereof respectively to support communication with each WLAN device 1202, 1204, and 1206, for example.

Further, the AP 1200 and WLAN devices 1202, 1204, and 1206 are backwards compatible with the IEEE 802.11(a), (b), (g), and (n) operating standards. In supporting such backwards compatibility, these devices support signal formats and structures that are consistent with these prior operating standards. With the structure of FIG. 13, the access point enacts OFDMA cluster parsing to support MU-MIMO. With the structure and operation of FIG. 13, data intended for each user may be encoded separately. The structure of FIG. 13 supports K users, with detail shown for the Kth user. Cn is the cluster number. Generally, operation of such structure is described with the following equations:

$$T = \sum_{c=1}^{N_C} S(c) \quad S(c) = \sum_{i=1}^{N_{ss}(c)} s(i_{ss}, c) \quad s(i_{ss}, c) = \max\left\{1, \frac{N_{BPSCS}(i_{ss})}{2}\right\}$$

Figure 13A:
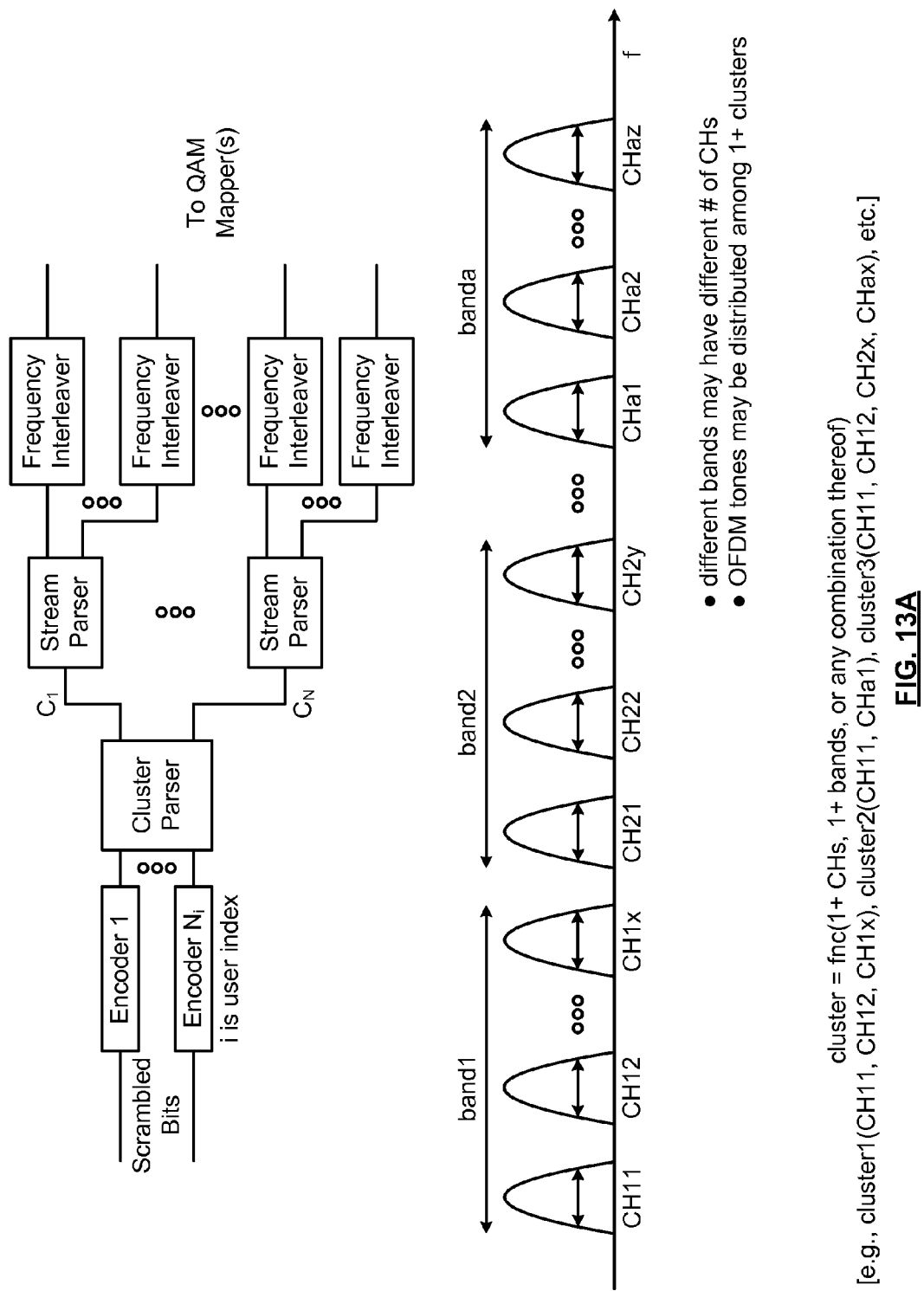
FIG. 13A is a diagram illustrating an embodiment of a structure employed by an access point (or WLAN) device supporting orthogonal frequency division multiple access (OFDMA) cluster parsing.

FIG. 13A is a diagram illustrating an embodiment of a structure employed by an access point (or WLAN) device supporting orthogonal frequency division multiple access (OFDMA) cluster parsing. In a multi-user embodiment, each user is encoded separately. This diagram shows encoding and interleaving for only one user. When multiple encoders are employed for a single user, scrambled bits are assigned to various respective encoders in a round robin fashion on a per bit basis. The cluster parser (in accordance with performing spatial multiplexing) allocates encoded bits to clusters assigned to the same user. Generally speaking, a cluster is a depiction of the mapping of tones, such as for an OFDM symbol, within or among one or more channels (e.g., subdivided portions of the spectrum) that may be situated in one or more bands (e.g., portions of the spectrum separated by relatively larger amounts). As an example, various channels of 80 MHz may be situated within or centered around a 5 GHz band. The channels within any such band may be continuous (e.g., adjacent to one another) or discontinuous (e.g., separated by some guard interval or band gap). Oftentimes, one or more channels may be situated within a given band, and different bands need not necessarily have a same number of channels therein.

In the equation shown above, $s(i_{ss},c)$ is the number of coded bits per dimension on the $i_{ss}$'th spatial stream of cluster c. The value, S(c), is the sum of $s(i_{ss},c)$ over all spatial streams in cluster c and T is the sum of S(c) over all clusters. Consecutive blocks of S(c) bits are assigned to different clusters in a round robin fashion. If multiple encoders are used, T consecutive encoded bits from a single encoder are used for one round robin cycle across the clusters. Operating together, the different encoders are used in a round robin fashion. For example, a first group of consecutive bits generated by a first encoder are allocated across the clusters (e.g., a first group of those consecutive bits going to a first cluster, then a second group of those consecutive bits going to a second cluster, and so on until the first group of consecutive bits are all employed). Then, a second group of consecutive bits generated by a second encoder are allocated across the clusters (continuing from where the first group of consecutive bits had ended). This process continues across all of the encoders and will return back to the first encoder after processing the consecutive bits generated by the last encoder in the group.

Various embodiments may operate in accordance with stream parsing that is in accordance with the IEEE 802.11n specification. Each of the respective stream parsers allocates bits within a cluster to spatial streams in accordance with the IEEE 802.11n specification. Each spatial stream is frequency interleaved according to 20 MHz interleaver corresponding to a frame type for the respective user. Again, this diagram shows encoding and interleaving for only one user.

Figure 13B:
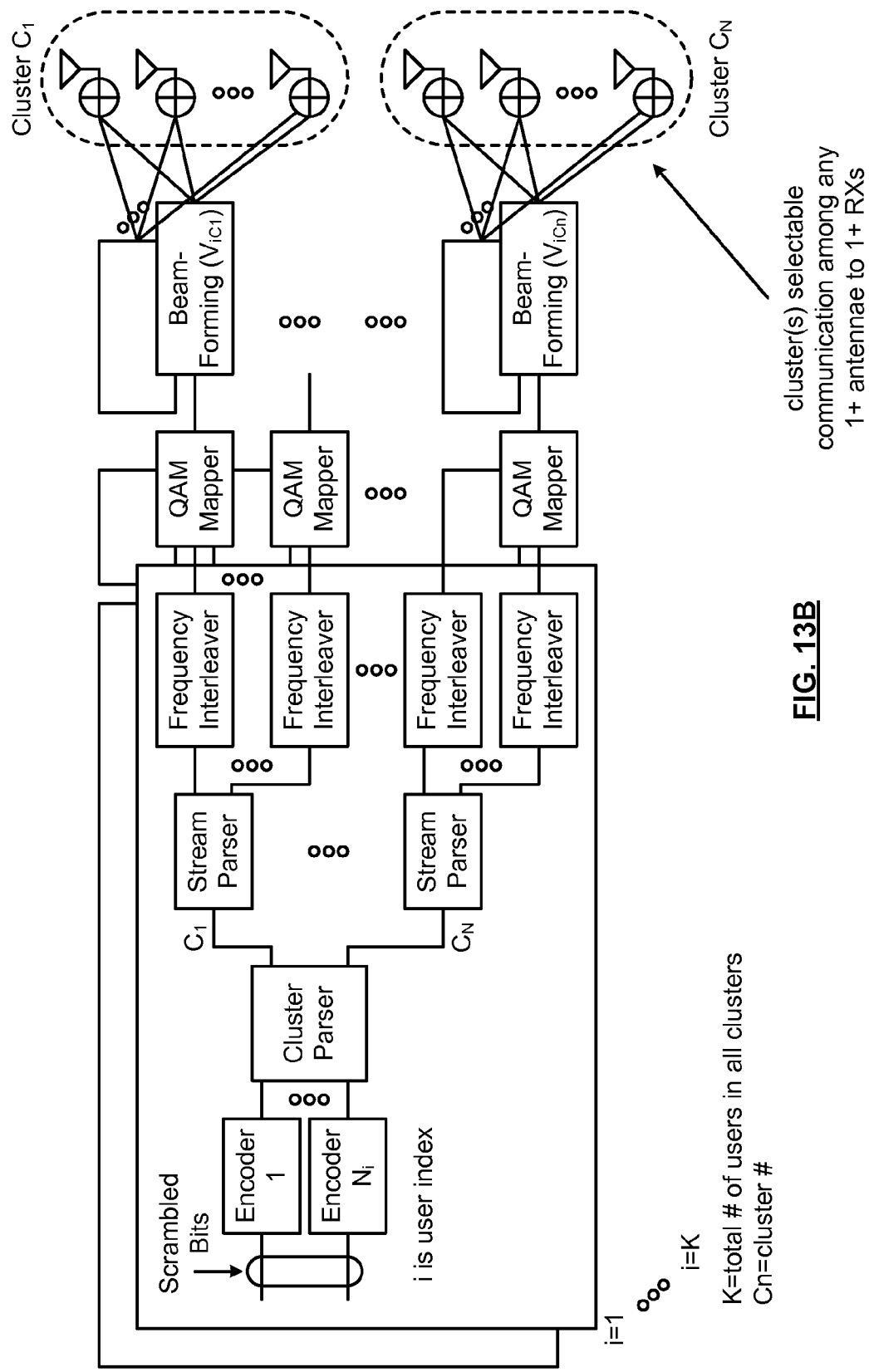
FIG. 13B is a diagram illustrating an embodiment of a structure employed by an access point (or WLAN) device supporting multi-user OFDMA (MU-OFDMA).

FIG. 13B is a diagram illustrating an embodiment of a structure employed by an access point (or WLAN) device supporting multi-user OFDMA (MU-OFDMA). Again, as described above, each user is encoded separately. Whereas the previous diagram shows encoding and interleaving for only one user, this diagram shows, in each layer, encoding and interleaving for one user (Same as previous slide for each user). However, the multiple layers then correspond to multiple users. The beamforming matrix $V_{iCj}$ may be found to maximize the aggregate capacity for all users, where i is a user index and Cj is a cluster index. The size of $V_{iCj}$ is $Nt_{Ci} \times Nsts_i$ where $Nt_{Ci}$ is the number of transmit antennae for cluster $C_i$ and $Nsts_i$ is the number of space-time stream for user i. The transmit antennae for each cluster is conceptual: operating at carrier frequency for cluster $C_i$. Physically, $n_{Ci}^{th}$ transmit antenna for cluster Ci may be shared with $m_{Cj}^{th}$ transmit antenna for cluster Cj. The cluster parser allocates encoded bits to clusters assigned to the same user, where $s(i_{ss},c)$ is the number of coded bits per dimension on the $i_{ss}$'th spatial stream of cluster c.

Analogous to the previous embodiment, the value, S(c), is the sum of $s(i_{ss},c)$ over all spatial streams in cluster c and T is the sum of S(c) over all clusters. Consecutive blocks of S(c) bits are assigned to different clusters in a round robin fashion. If multiple encoders are used, T consecutive encoded bits from different encoders are used in a round robin fashion. Various embodiments may operate in accordance with stream parsing that is in accordance with the IEEE 802.11n specification. Each of the respective stream parsers allocates bits within a cluster to spatial streams in accordance with the IEEE 802.11n specification. Each spatial stream is frequency interleaved according to 20 MHz interleaver corresponding to a frame type for the respective user.

The structure employed within FIG. 13A and alternatively, FIG. 13B, includes at least one encoder for encoding one or more information bits thereby generating coded bits. Again, any of a variety of ECCs may be employed by the at least one encoder, and different ECCs may be employed for different of the encoders. Moreover, various of the encoders may operate not only in accordance with different ECCs, but may have other different operational parameters such as different code rates, etc. The one or more cluster parsers are implemented for assigning the coded bits among various clusters corresponding to the various wireless communication devices to which communications are to be made. For example, a cluster mapping provides an assignment of the coded bits based on the particular wireless communication devices to which communications are to be made. The antennae of the transmitting device are for transmitting the coded bits, using the plurality of clusters, to the plurality of wireless communication devices.

There are a variety of means by which the coded bits may be assigned among the clusters. For example, a first subset of the coded bits may be assigned among a first cluster, and a second subset of the coded bits may be assigned among a second cluster. A first subset of the antennae operate by transmitting the first subset of coded bits, using the first cluster, to a first wireless communication device, and a second subset of the antennae operate by transmitting the second subset of coded bits, using the second cluster, to a second wireless communication device. The various subsets of the antennae may include one or more common antennae (e.g., one of the antennae may be in more than one subset employed for transmitting signals).

Alternatively, a first subset of the coded bits maybe assigned among a first group of clusters (e.g., more than one cluster), and a second subset of the coded bits may be assigned among a second group of clusters (e.g., also more than one cluster). In such an instance, the transmitting communication device may include the stream parsers for allocating the first subset of coded bits to a first spatial stream and allocating the second subset of coded bits to a second spatial stream. Respective subsets of the antennae may be employed for each of the spatial streams (e.g., a first subset of the antennae for transmitting the first spatial stream, and a second subset of the antennae for transmitting the second spatial stream). Also, the various subsets of coded bits need not have identical number of bits.

The various clusters employed for communications may be varied in nature. For example, a cluster may be composed with as few as one channel within one band. Alternatively, a cluster may be composed with a first channel in a first band and a second channel in a second band. A cluster may alternatively be composed with a first number of channels in a first band and a second band and a second number of channels in a third band and a fourth band. In some instances, the third band is the first band, and the fourth band is the second band.

With the structure of FIG. 13B, an AP may simultaneously transmit a multi-user multiple input multiple output (MU-MIMO) and/or orthogonal frequency division multiple access (OFDMA) frame (alternatively, referred to as packet) to a plurality of WLAN devices.

In some embodiments, acknowledgement (ACK) of these respective transmissions within such an MU-MIMO and/or OFDMA frame must be received from each WLAN device. Several of the following diagrams and related written description describe embodiments for acknowledgement for such transmissions. The transmissions may be OFDMA, MU-MIMO or MU-MIMO/OFDMA. OFDM is a subset of OFDMA when a single user transmits at a given time. MIMO also includes SISO, SIMO, and MISO. OFDMA clusters may be continuous or discontinuous. Transmissions on different OFDMA clusters may be simultaneous or non-simultaneous. Any communication device may be capable of supporting a single cluster or multiple clusters. Again, a cluster may be composed on one or more channels within or among one or more bands. A cluster may be as few as a single channel within a single band.

A MU-MIMO/OFDMA capable transmitter (e.g., an AP) may transmit packets to more than one wireless station (STA) on a same cluster in a single aggregated packet (in accordance with time multiplexing). Channel characterization and training may be performed for each of the different communication channels corresponding to the various respective wireless communication devices (e.g., STAs).

Generally, some data transmissions may be targeted for reception by multiple individual receivers—e.g. MU-MIMO and/or OFDMA transmissions, which are different than single transmissions with a multi-receiver address. For example, a single OFDMA transmission uses different tones or sets of tones (e.g., clusters or channels) to send distinct sets of information, each set of set of information transmitted to one or more receivers simultaneously in the time domain. Again, an OFDMA transmission sent to one user is equivalent to an OFDM transmission. A single MU-MIMO transmission may include spatially-diverse signals over a common set of tones, each containing distinct information and each transmitted to one or more distinct receivers. Some single transmissions may be a combination of OFDMA and MU-MIMO. MIMO transceivers illustrated may include SISO, SIMO, and MISO transceivers. Transmissions on different OFDMA clusters may be simultaneous or non-simultaneous. Legacy users and new version users (e.g., TGac MU-MIMO, OFDMA, MU-MIMO/OFDMA, etc.) may share bandwidth at a given time or they can be scheduled at different times for certain embodiments.

The intended receivers of the MU-MIMO/OFDMA transmissions need to respond to the transmitter an acknowledgement (e.g. either a single acknowledgement or a block acknowledgement may be provided). Acknowledgements need to be separated at the receiver, the separation performed through any of several means, or combinations of these means: temporally divided, frequency divided, code divided, e.g. multi-user precoding. For temporal separation, a scheme to define the time slotting is required, which may be slotted, polled, or a combination thereof. Any acknowledgement scheme may, if desired, have an option for reverse-data-aggregation such that data may be combined with an ACK. Hereinafter, the terms "ACK", "acknowledgement", and "BA" are all meant to be inclusive of either ACK or BA (block acknowledgement). For example, even if only one or ACK or BA is specifically referenced, such embodiments may be equally adapted to any of ACK or BA.

Different embodiments of ACK operations may be made in accordance with time slotted ACK transmissions or time scheduled ACK transmissions.

A first embodiment of ACK operations is to have time slotted ACK transmissions. Such embodiment may include an assignment of an order for clusters used for the data transmission such that ACK responses are ordered according to the cluster order, e.g. one slot of time for each cluster. The intended receivers respond in the order provided at fixed time points that are known separately from information that is conveyed within the MU-MIMO/OFDMA transmission (e.g., information regarding the size of each slot is exchanged, or they respond in the ordered sequence based on the detection of the respondents ACK transmissions).

This embodiment works well for OFDMA, but may be slightly more complicated for the combination of OFDMA and MU-MIMO. For such an OFDMA/MU-MIMO combination, receiving devices within a cluster are ordered. Such ordering is required when the data transmitter is SU-MIMO receiver, but is less efficient in such operations because there will be no ACKs on some clusters but not others. Such is the case because some clusters may have no transmission while other clusters are grouped but receiving devices are unaware of the absence of data for "other" clusters, so they still wait their turn to send and ACK for the cluster, even when no ACK is required for "missing" transmissions corresponding to the previous slot. This inefficiency can be avoided if the data transmitter does not schedule a time for clusters having no data transmitted, e.g., the transmitter may require an explicit signaling of which clusters have been used during this data transmission so that later users know that they do not need to wait for an ACK for a cluster that does not need one.

A second embodiment of ACK operations is to have time scheduled ACK transmissions. Such an embodiment may include an assignment of a set of specific times for clusters used for the data transmission such that ACK responses are transmitted according to the set of specific times (e.g., one start time and one end time for each cluster). The intended receivers respond according to the start and end times provided.

According to some aspects presented herein, the data and the ACK transmissions are protected by the network allocation vector (NAV), so no CSMA (Carrier Sense Multiple Access) is needed between the transmission of the data and ACKs. In such case, the data transmitter may specify either time for the ACK per cluster and the cluster to use for ACK transmission or a slotted order for the ACK transmissions. In such instances, the data transmitter knows the data transmission time and knows the BA (e.g., ACK) size, so it can accurately schedule a time for each receiver's ACK or BA, or provide an ordering for each receiver's ACK or BA knowing that the slot time is fixed through some other exchange of information regarding the size of the slots, or knowing that the slot time has an upper bound based on the duration of the ACK transmission. The scheduled transmission time for the ACK can be aggregated with data and transmitted with the data transmission. The scheduling information may be located within the MU-MIMO/OFDMA transmission as a separate control or management frame and may contain duration information that determines if aggregation of acknowledgements with data is permitted. The OFDMA/MU-MIMO data transmitter may assign the ACK for data to appear on the cluster on which it has transmitted that data in order to avoid cluster switching by the receiving device. Time slotted and scheduled acknowledgements reduce collision overhead compared to a scheme that employs CSMA-determined ACK responses.

Figure 14A:
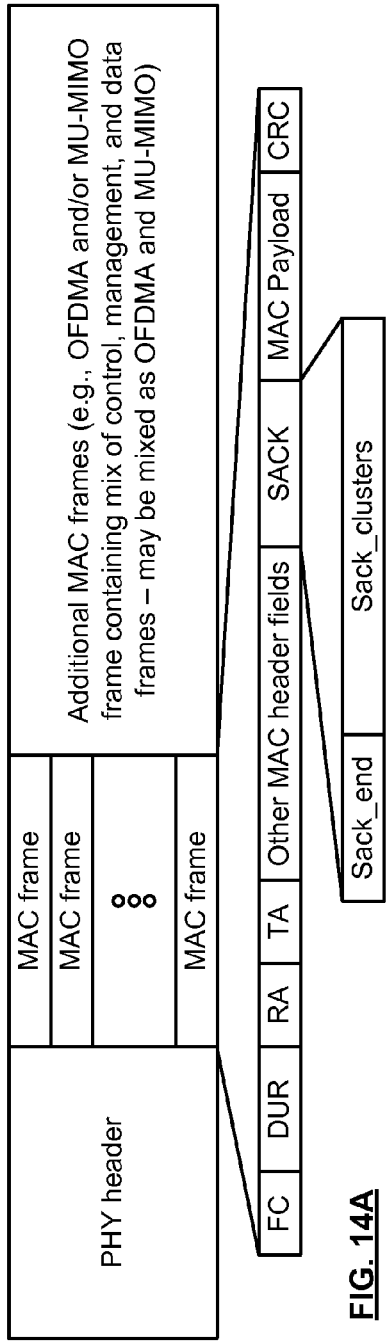
FIG. 14A is a diagram illustrating an embodiment of a structure used for conveyance of scheduled or slotted start time within an orthogonal frequency division multiple access (OFDMA)/multi-user multiple input multiple output (MU-MIMO) frame as media access control (MAC) frames.

FIG. 14A is a diagram illustrating an embodiment of a structure used for conveyance of scheduled or slotted start time within an orthogonal frequency division multiple access (OFDMA)/multi-user multiple input multiple output (MU-MIMO) frame as media access control (MAC) frames. The time slotted acknowledgement information is contained in MAC Headers that are part of the OFDMA/MU-MIMO transmission. Multiple MAC frames exist according to MU-MIMO and OFDMA dimensions of the transmission. Each MAC frame has information unique and specific to the receivers applicable for those dimensions.

With such structure: AID=STA identifier (e.g. 11-bit association identifier AID); Sack_end=STA scheduled acknowledgement slot end time, first start time begins at end of OFDMA/MU-MIMO packet reception; and Sack_clusters=Scheduled acknowledgement cluster assignment, e.g. set of clusters for acknowledgement, and the duration of the acknowledgement time slot is previous Sack_end time to this Sack_end time. The SAC field can occur in multiple MAC frames within the OFDMA/MU-MIMO frame, e.g., zero or once or multiple times for any given RA.

Figure 14B:
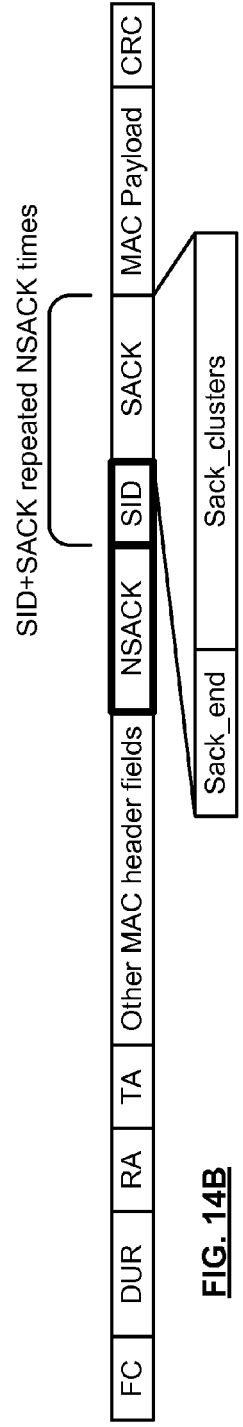
FIG. 14B is a diagram illustrating an embodiment of a structure used for indicating multiple SACK fields in one MAC frame.

FIG. 14B is a diagram illustrating an embodiment of a structure used for indicating multiple SACK fields in one MAC frame. This is another diagram illustrating a structure used for conveyance of slotted start time within an OFDMA/MU-MIMO frame as MAC frames. The structure of FIG. 14B is similar to that of FIG. 14A. With the structure of FIG. 14B, the SACK field may occur multiple times within a single frame, e.g., if multiple recipients are sent frames sequentially within a single cluster. In such case, the MAC header field (e.g., NSACK) indicates the number of SACK fields that will appear and each SACK field needs to be accompanied by an AID or 48-bit MAC address. In such case, each SID contains an AID or 48-bit address. The SACK field structure previously described may be employed and the SID+SACK may be repeated NSACK times.

Figure 14C:
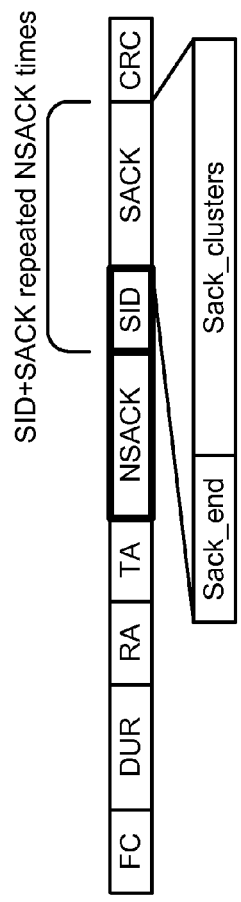
FIG. 14C is a diagram illustrating an alternative embodiment of a structure used for indicating multiple SACK fields in one MAC frame.

FIG. 14C is a diagram illustrating an alternative embodiment of a structure used for indicating multiple SACK fields in one MAC frame. With the structure of FIG. 14C, the SAC can occur as an independent MAC frame, which contains mostly only the SACK field—that is, no MAC payload as in the case of an IEEE 802.11 control type frame.

Figure 15:
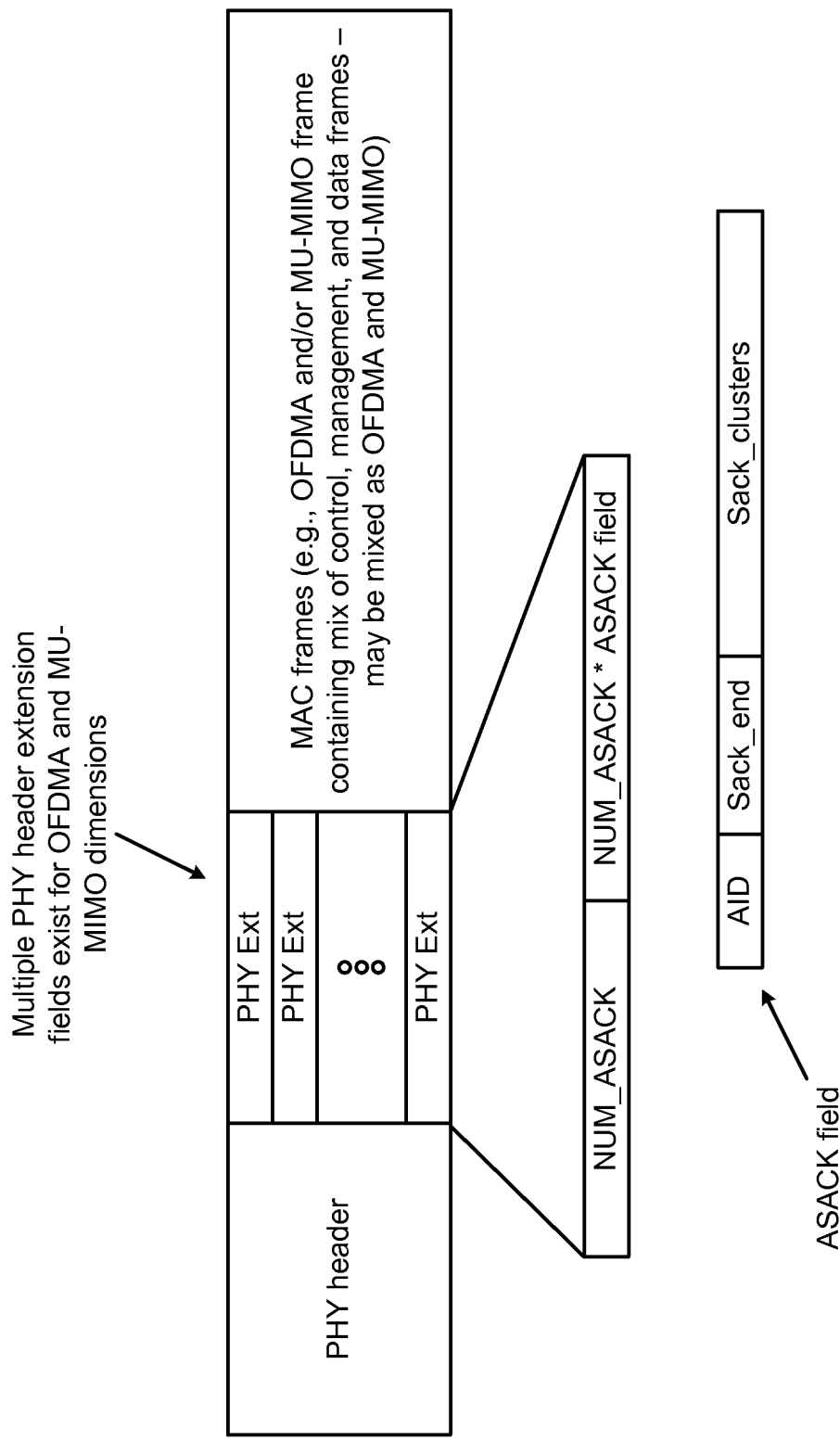
FIG. 15 is a diagram illustrating an embodiment of a structure used for the conveyance of start time within an OFDMA/MU-MIMO frame as a PHY Header extension.

FIG. 15 is a diagram illustrating an embodiment of a structure used for the conveyance of start time within an OFDMA/MU-MIMO frame as a PHY Header extension. The acknowledgement information is contained in multiple PHY Header extension fields that exist for OFDMA and MU-MIMO dimensions. Multiple PHY Header extension fields exist according to MU-MIMO and OFDMA dimensions of the transmission. Each MAC frame has information unique and specific to the receivers applicable for those dimensions.

With such structure: AID=STA identifier (e.g. 11-bit association identifier AID); Sack_end=STA scheduled acknowledgement slot end time, first start time begins at end of OFDMA/MU-MIMO packet reception; and Sack_clusters=Scheduled acknowledgement cluster assignment, e.g. set of clusters for acknowledgement, and the duration of the acknowledgement time slot is previous Sack_end time to this Sack_end time.

Many of the following diagrams show coordination and scheduling using various means (e.g., time-slotted, polling, etc.) by which the various users in a multi-user communication system may provide their respective acknowledgements (ACKs) back to the transmitting communication device (e.g., an AP that makes a transmission to wireless stations (STAs)).

Generally speaking, various aspects of the invention are directed to a communication device (e.g., an AP in some instance) including a baseband processing module for generating a multi-user frame. Such a multi-user packet may be a multiple input multiple output (MU-MIMO) packet, an orthogonal frequency division multiple access (OFDMA) packet, or a MU-MIMO/OFDMA packet. It is of course noted that various other components may be interveningly coupled between such a circuitry and/or module that generates such a multi-user frame and at least one antenna within the wireless communication device. The transmitting wireless communication device employs at least one antenna for transmitting the multi-user packet to a number of wireless communication devices. In response to the multi-user packet, the wireless communication device operates by receiving respective acknowledgements (ACKs) from all or a subset of the wireless communication devices to which the multi-user packet has been sent. The multi-user packet that is transmitted to the wireless communication devices includes ACK instructions corresponding respectively to each of the wireless communication devices. In other words, in one instance, the multi-user packet itself includes time slotting for the wireless communication devices to provide their respective ACK to the transmitting communication device. Alternatively, polling may be provided from the transmitting wireless communication device to give explicit directions to each of the receiving wireless communication devices regarding the manner in which its respective ACK is to be provided.

Such ACK instructions may direct a variety of parameters by which the ACKs are to be provided (e.g., the order among the wireless communication devices by which the ACKs are to be provided, the one or more clusters to be employed by each of the wireless communication devices when making an ACK, the cluster assignments themselves among the various wireless communication devices). Depending on the receive capability of the transmitting wireless communication device and its capability to receive the ACKs, the ACKs may be provided sequentially (serially) or simultaneously and in parallel (e.g., of the transmitting wireless communication device has MU-MIMO and/or OFDMA receive capability).

The various wireless communication devices to which the multi-user packet is transmitted may be a mix of different types of wireless communication devices, including legacy wireless communication devices, and also including MU-MIMO and/or OFDMA compatible wireless communication devices.

Figure 16:
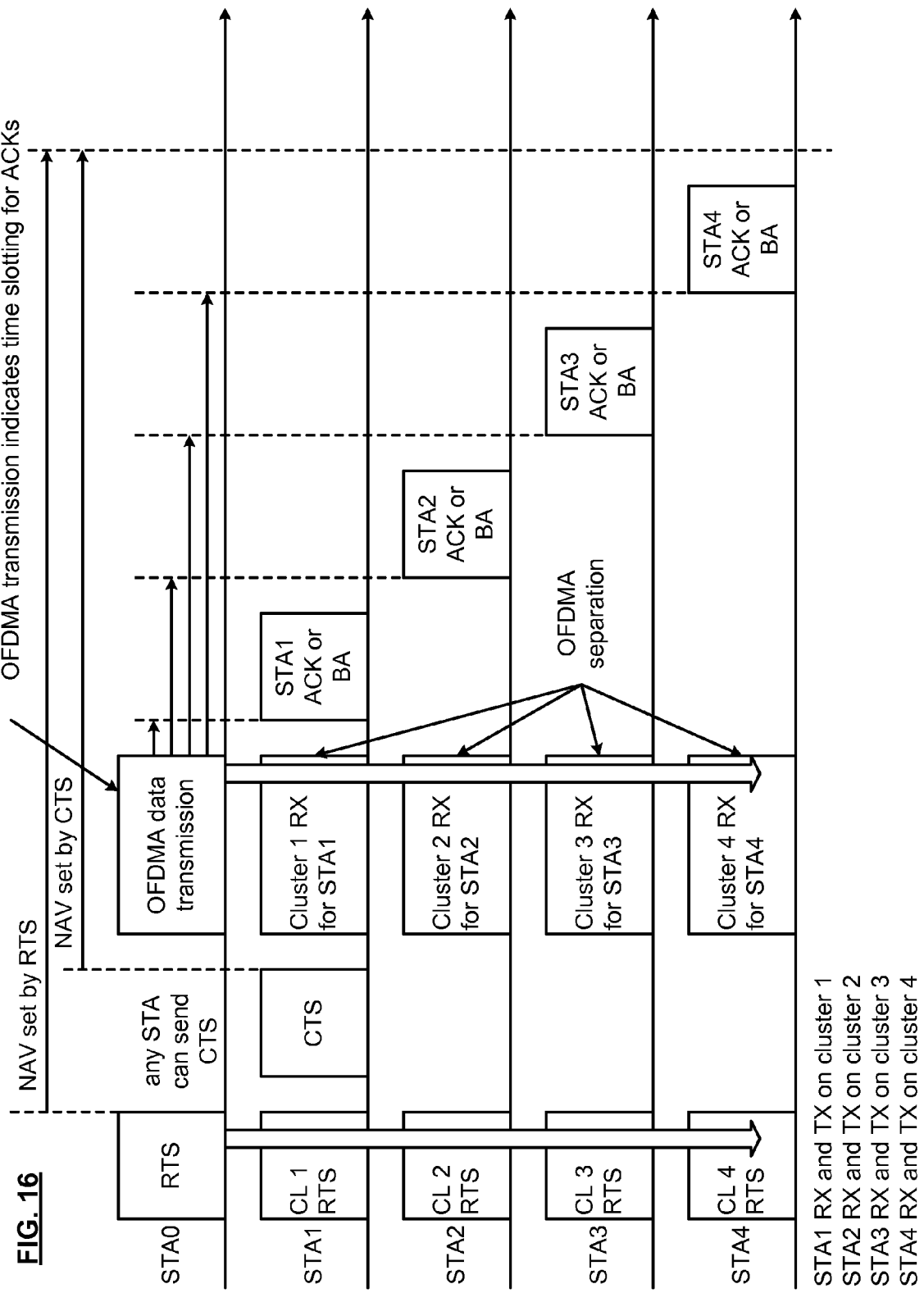
FIGS. 16 and 17 are signal diagrams illustrating embodiments of time slotted/scheduled acknowledgements showing network allocation vector (NAV) protection for acknowledgements.
Figure 17:
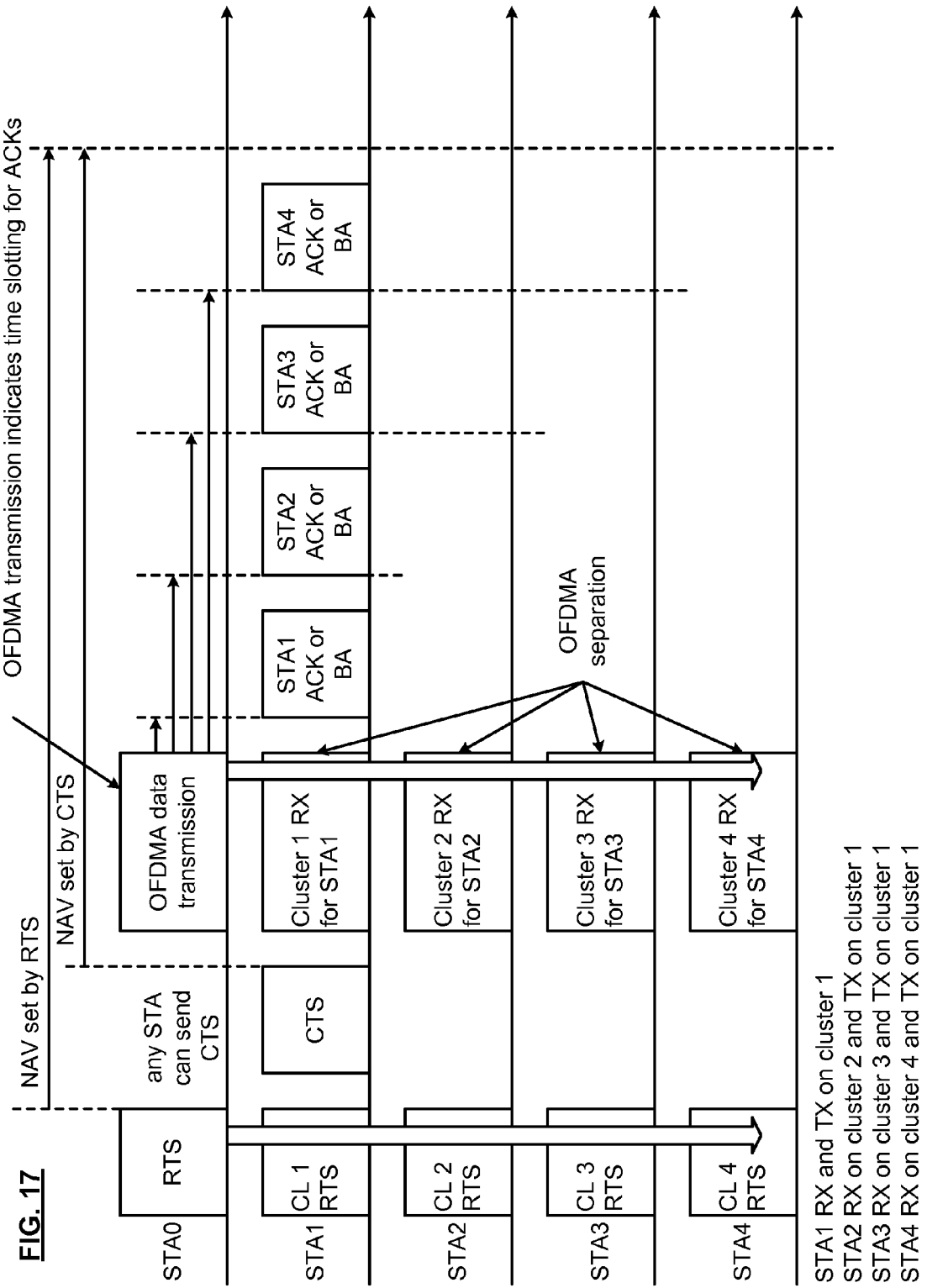

FIGS. 16 and 17 are signal diagrams illustrating embodiments of time slotted/scheduled acknowledgements showing network allocation vector (NAV) protection for acknowledgements. A request to send (RTS) is sent from STA0, onto each of the clusters shown, clusters 1, 2, 3, 4. STA1 responds with a clear to send (CTS) transmission on cluster 1. An OFDMA data transmission is made to multiple STAs on clusters 1, 2, 3, 4. The contents thereof are frequency separated. While this particular embodiment shows an OFDMA data transmission, the data transmission may alternatively be a MU-MIMO data transmission, or an OFDMA/MU-MIMO data transmission. It is also noted that these specific examples and embodiments are not exhaustive, and the principles described herein may be adapted to accommodate any desired configuration and manner of providing ACKs.

STA1 receives and transmits on cluster 1, STA2 receives and transmits on cluster 2, STA3 receives and transmits on cluster 3, and STA4 receives and transmits on cluster 4. Referring to FIG. 17, STA1 receives and transmits on cluster 1, STA2 receives on cluster 2 and transmits on cluster 1, STA3 receives on cluster 3 and transmits on cluster 1, and STA4 receives on cluster 4 and transmits on cluster 1. In other words, all of the STAs provide their respective ACKs on the same cluster.

In these and other diagrams, the OFDMA separation may be seen among the various respective clusters employed by the different transmissions related to different STAs.

Figure 18:
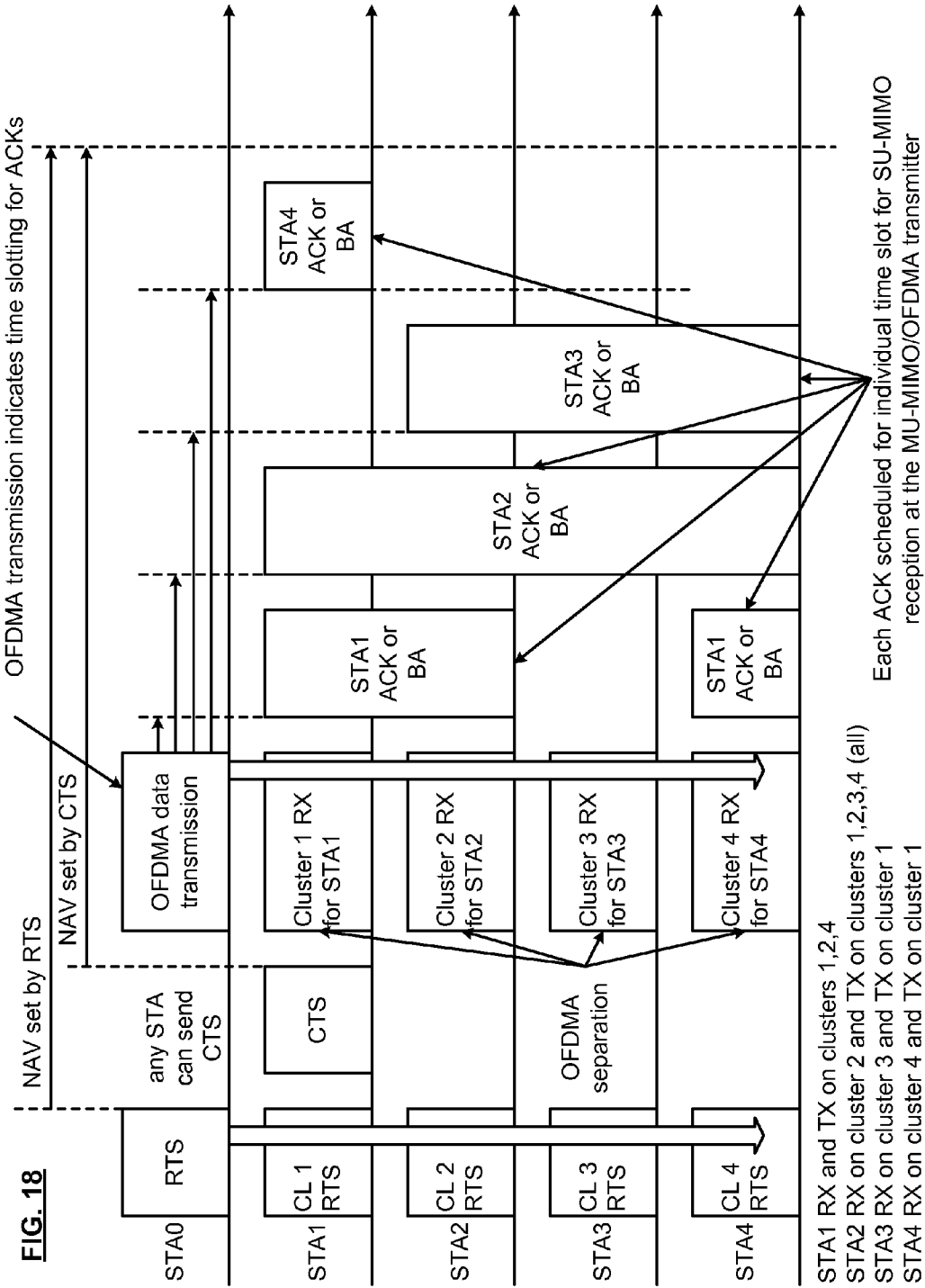
FIG. 18 is a signal diagram illustrating an embodiment of time slotted or scheduled acknowledgements that are transmitted in multiple clusters.

FIG. 18 is a signal diagram illustrating an embodiment of time slotted or scheduled acknowledgements that are transmitted in multiple clusters. With this signal diagram, STA1 has the capability to receive and transmit on clusters 1, 2, and 4, and in the diagram, receives information on cluster 1 and transmits an ACK on clusters 1, 2, and 4. STA2 receives on cluster 2 and transmits on clusters 1, 2, 3, and 4 (i.e., all of the clusters). STA3 receives on cluster 3 and transmits on clusters 2, 3, 4. STA4 receives on cluster 4 and transmits on cluster 1.

Figure 19:
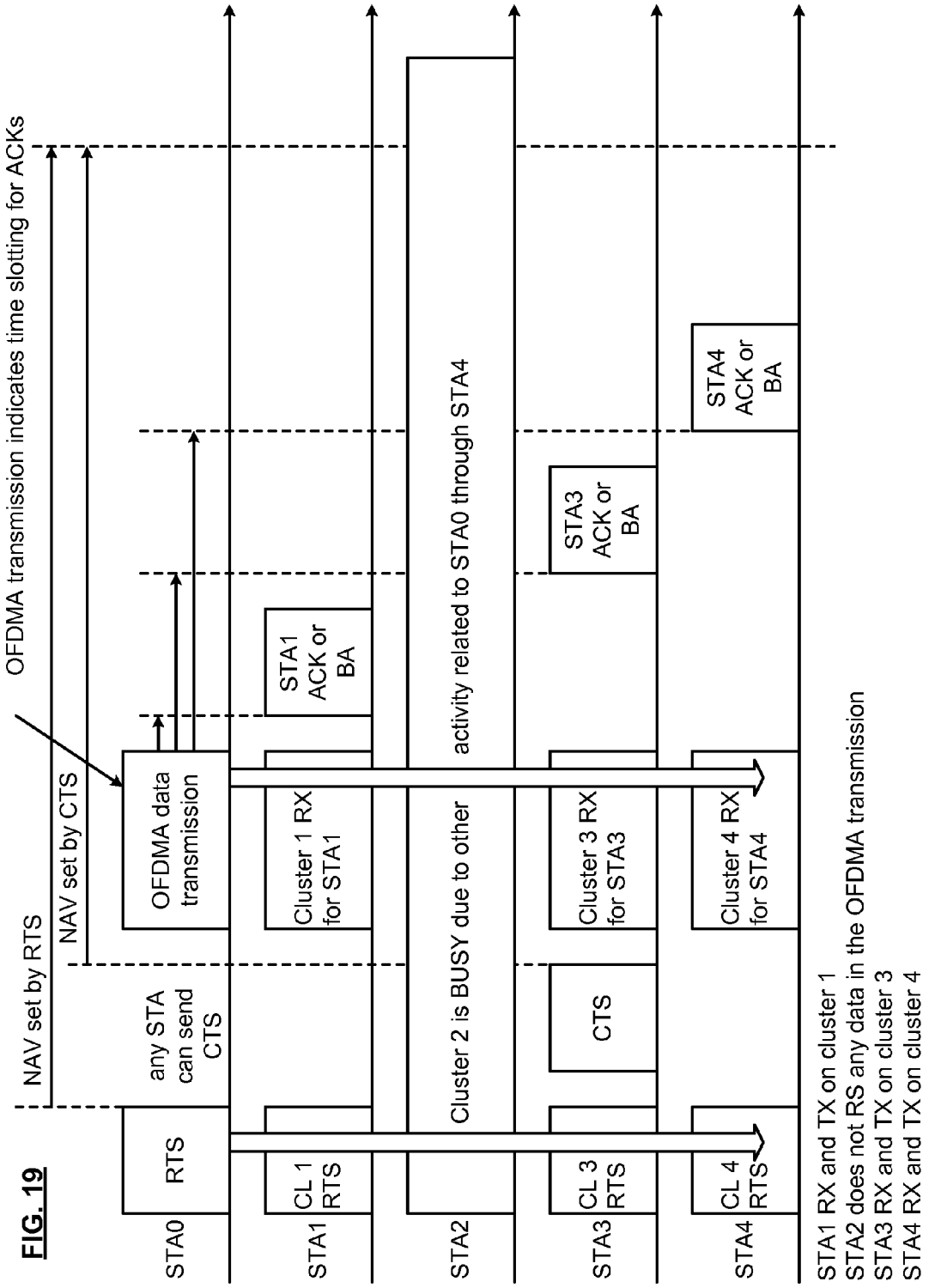
FIG. 19 is a signal diagram illustrating an embodiment of time slotted or scheduled acknowledgements that are transmitted in multiple clusters when a cluster is not in use.

FIG. 19 is a signal diagram illustrating an embodiment of time slotted or scheduled acknowledgements that are transmitted in multiple clusters when a cluster is not in use. For example, this diagrams shows that one of the clusters is not used the transmitter during the MU-MIMO data transmission (i.e., cluster 2 carries no part of the MU-MIMO data transmission). With this signal diagram, STA1 receives and transmits on cluster 1, STA2 does not receive any data in the OFDMA transmission, STA3 receives and transmits on cluster 3, and STA4 receives and transmits on cluster 4.

Figure 20:
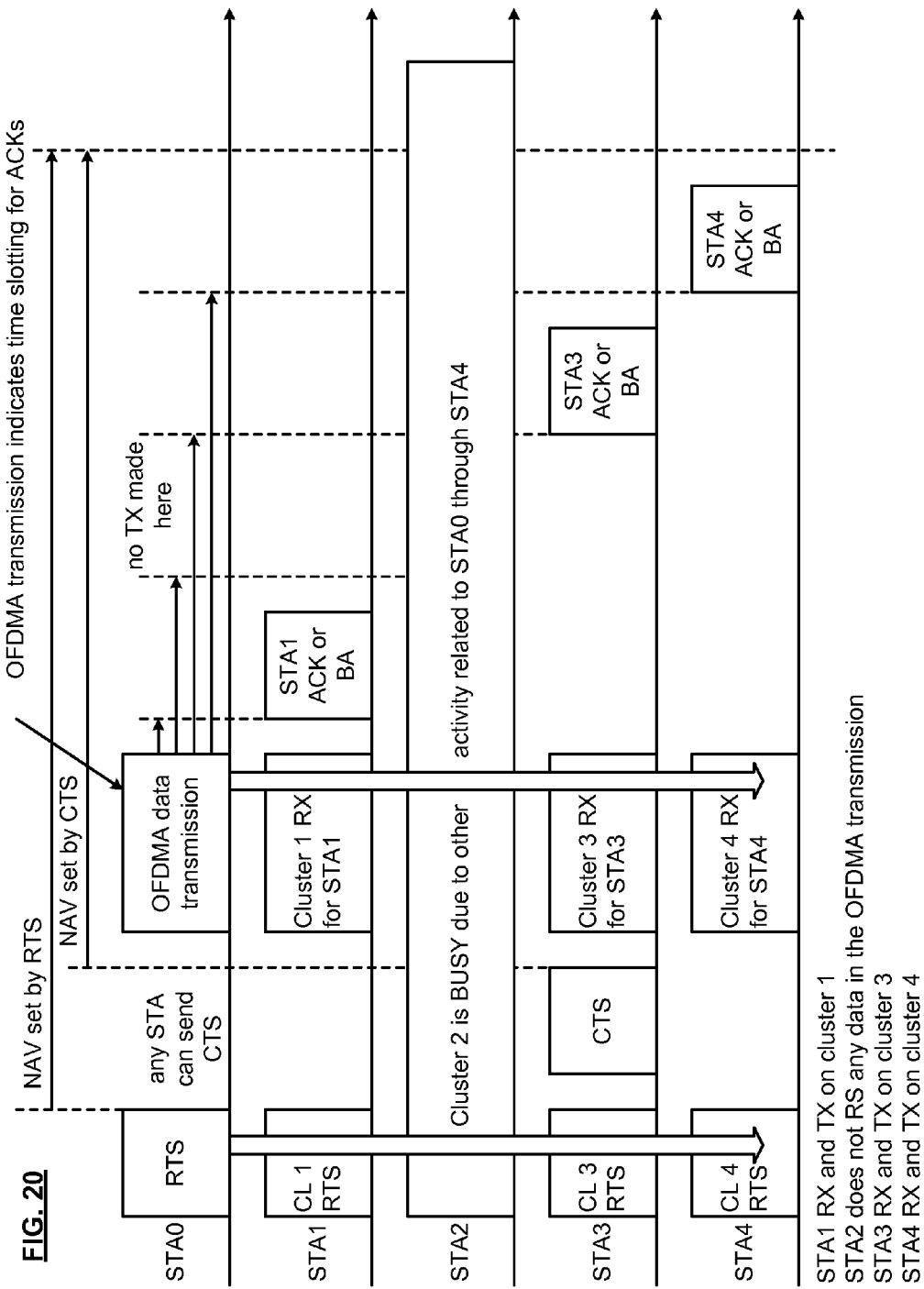
FIG. 20 is a signal diagram illustrating an embodiment of fixed acknowledgement slotting.

FIG. 20 is a signal diagram illustrating an embodiment of fixed acknowledgement slotting. With the example of FIG. 20, STA1 receives and transmits on cluster 1, STA2 does not receive any data in the OFDMA transmission, STA3 receives and transmits on cluster 3, and STA4 receives and transmits on cluster 4. In this diagram, there is a time that would potentially be wasted with no transmission made there.

FIGS. 21, 22, 23, 24, 25, 26, 27, 28, and 29 are signal diagrams illustrating embodiments of time slotted or scheduled acknowledgement sequences when one or more STAs share channel (e.g., OFDMA and/or MU-MIMO).

Figure 21:
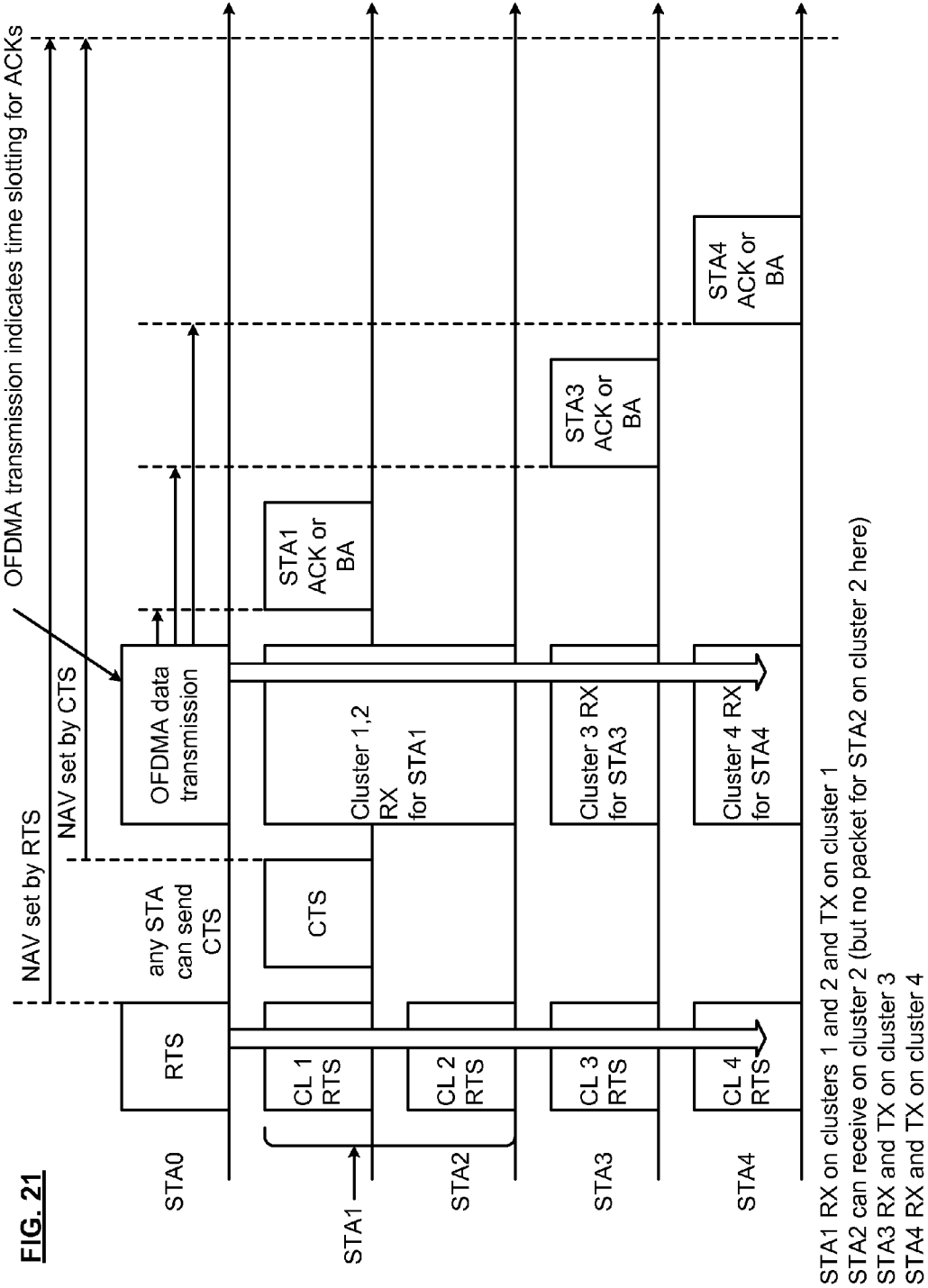

FIG. 21 is a signal diagram illustrating a time slotted acknowledgement sequence when a STA shares clusters. With this signal diagram, STA1 receives on clusters 1 and 2 and transmits on cluster 1, STA2 can receive on cluster 2, but in this case, there is no packet for STA2 on cluster 2, STA3 receives and transmits on cluster 3, and STA4 receives and transmits on cluster 4.

Figure 22:
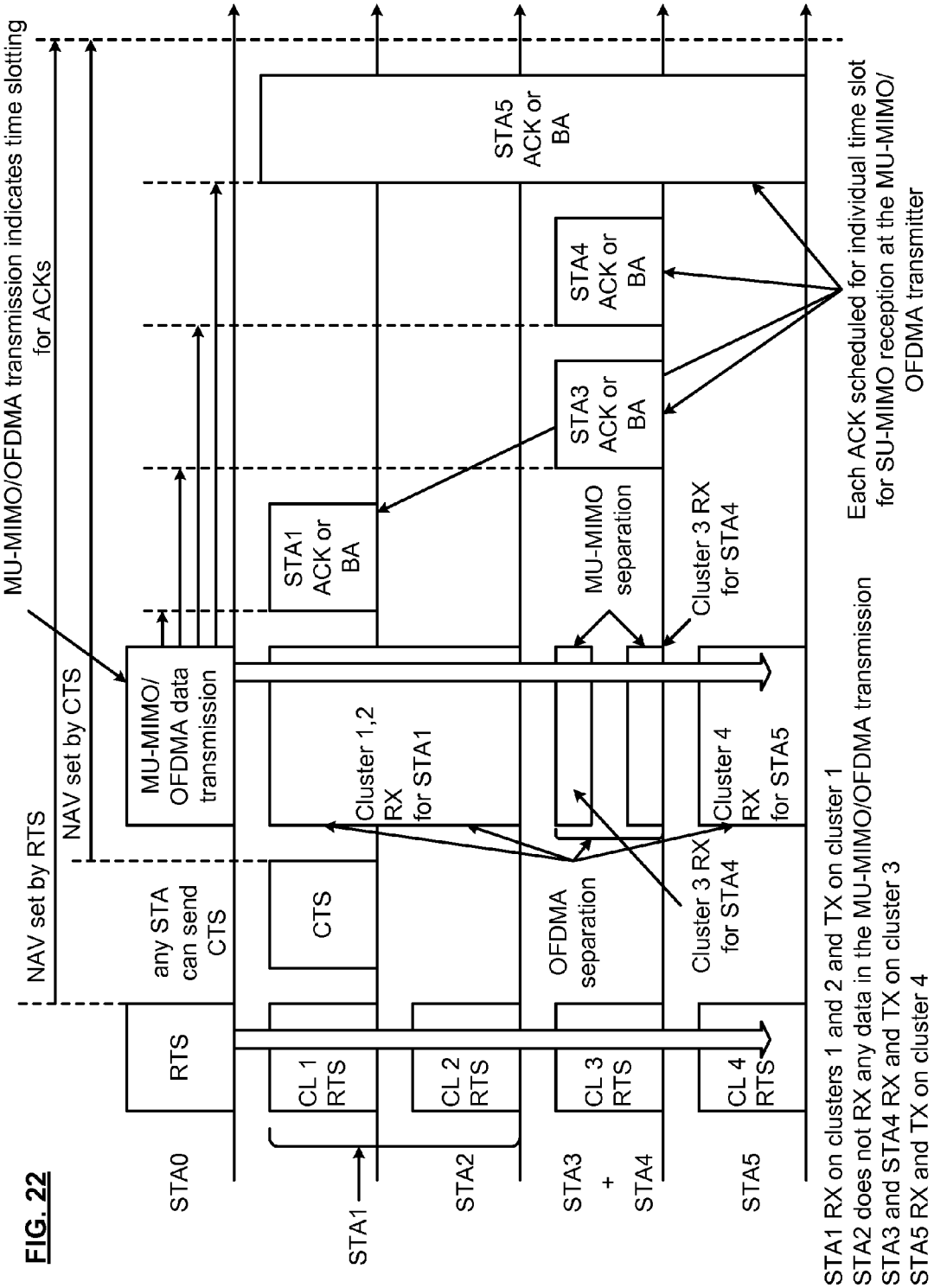

FIG. 22 is a signal diagram illustrating a time slotted acknowledgement sequence when STAs shares clusters (e.g., OFDMA and MU-MIMO). With this signal diagram, STA1 receives on clusters 1 and 2 and transmits on cluster 1, STA2 does not receive any data in the MU-MIMO/OFDMA transmission, STA3 and STA4 receive and transmit on cluster 3, and STA5 receives on cluster 4 and transmits on clusters 1, 2, 3, and 4. This diagram shows one spatial respective dimension for each of STA3 and STA4 existing within one of the clusters (e.g., cluster 3), for a total of two spatial dimensions used by the MU-MIMO/OFDMA data transmission within cluster 3.

When the MU-MIMO/OFDMA data transmitter is limited to SU-MIMO receive capability (i.e., does not include simultaneous receive capability), then a single RF Front End on the data transmitter (SU-MIMO) is employed for reception. If MU-MIMO is used for the data transmission, then recipients may transmit the ACKs to the data transmitter sequentially (e.g., one at a time). Again, for the combination of OFDMA and MU-MIMO data transmission, the ACKs must be made sequential across both the cluster and spatial domains as described and shown previously.

However, there may be instances when a MU-MIMO/OFDMA data transmitter also has OFDMA/MU-MIMO receive capability. Such an embodiment would include a data transmitter having parallel RF Front Ends and simultaneous multipacket reception capability. The ACK transmission on individual clusters and also on multiple clusters may both be scheduled simultaneously as described later herein when, for example, the transmitting communication device (e.g., AP) has simultaneous receive capability.

Time slotted or scheduled operation offers complete flexibility for all combinations of OFDMA/MU-MIMO capabilities at receivers and transmitters.

FIGS. 23, 24, 25, 26, 27, and 28 are signal diagrams illustrating various examples of time slotted or scheduled ACK reception.

Figure 23:
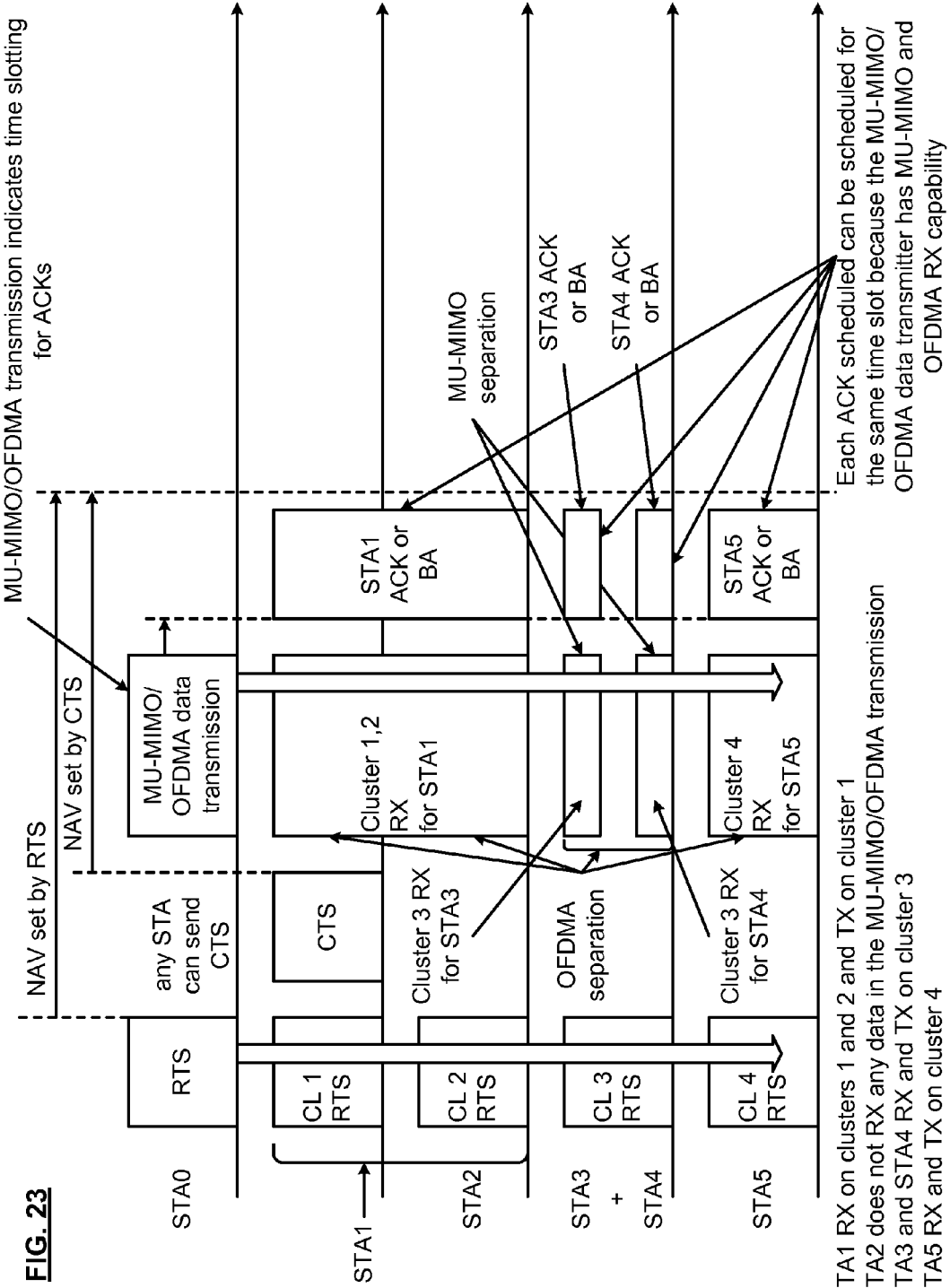

FIG. 23 illustrates an ACK scheduling example for OFDMA receive capability at an MU-MIMO data transmitter. This diagram shows that the transmitting device has simultaneous receive capability (i.e., can receive two or more ACKs at the same time, so two or more STAs can send their respective ACKs simultaneously or in parallel with one another). With the example of FIG. 23, STA1 receives on clusters 1, and 2, and transmits on clusters 1, and 2. STA2 does not receive any data in the MU-MIMO/OFDMA transmission. STA3 receives on cluster 3, and transmits on cluster 3. STA4 receives on cluster 3, and transmits on cluster 3. STA5 receives on cluster 4 and transmits on cluster 4. As described elsewhere, the Sack_clusters field needs to indicate the ordering of which STAs are to send back their respective ACKs, and in this case of a multiple simultaneous reception capability at the MU-MIMO data transmitter, all ACKs are scheduled for the same time, but on different clusters and/or spatial streams.

Figure 24:
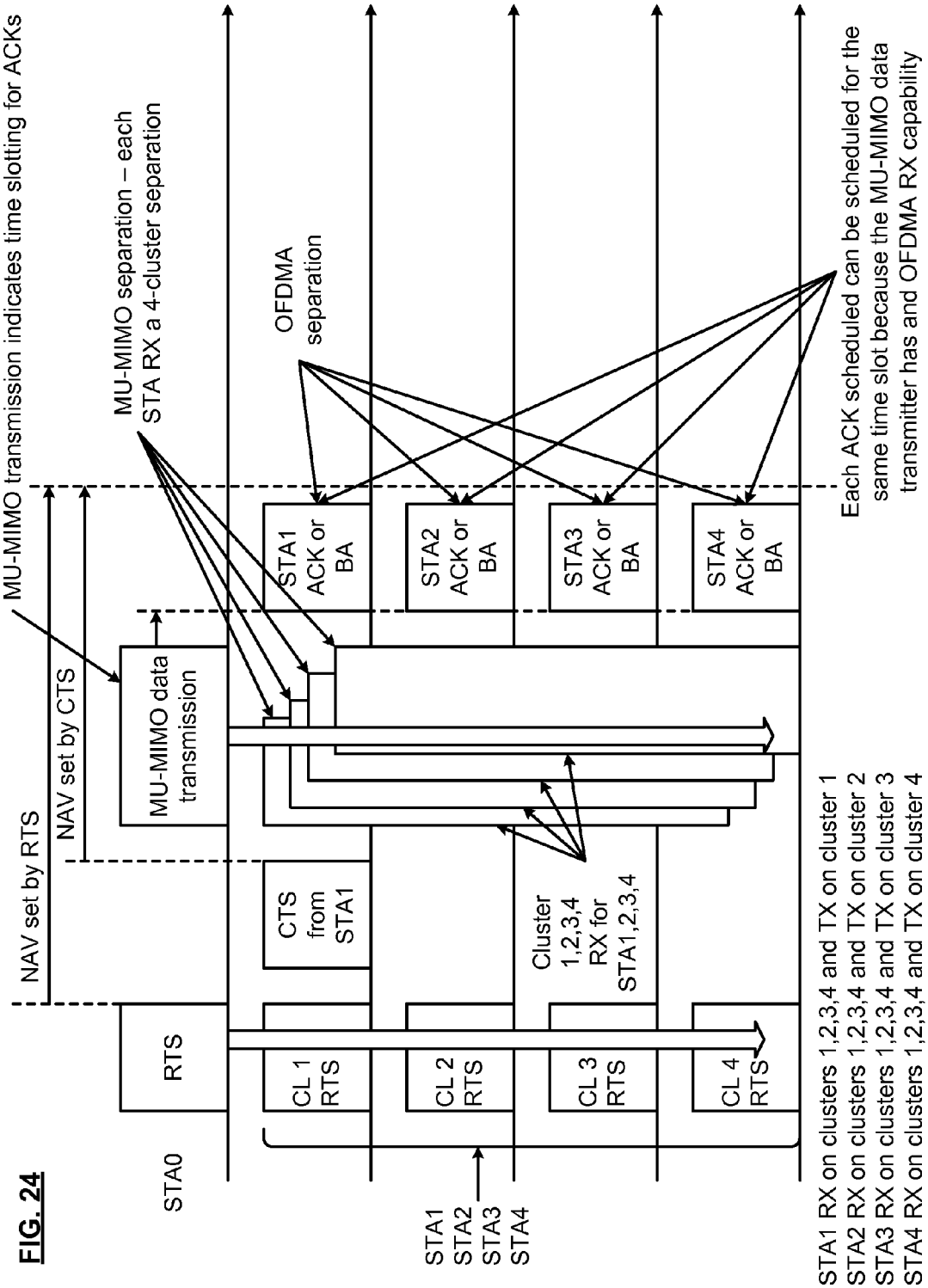

FIG. 24 illustrates a time scheduled ACK sequence with multi-cluster MU-MIMO data transmission, showing in particular ACK scheduling for OFDMA receive capability at a MU-MIMO data transmitter. With the example of FIG. 24, STA1 receives on clusters 1, 2, 3, and 4 and transmits on cluster 1. STA2 receives on clusters 1, 2, 3, and 4 and transmits on cluster 2. STA3 receives on clusters 1, 2, 3, and 4 and transmits on cluster 3. STA4 receives on clusters 1, 2, 3, and 4 and transmits on cluster 4. This diagram shows a 4 clusters wide frame and each respective STA is directed to ACK on a separated and respective cluster at the same time.

Figure 25:
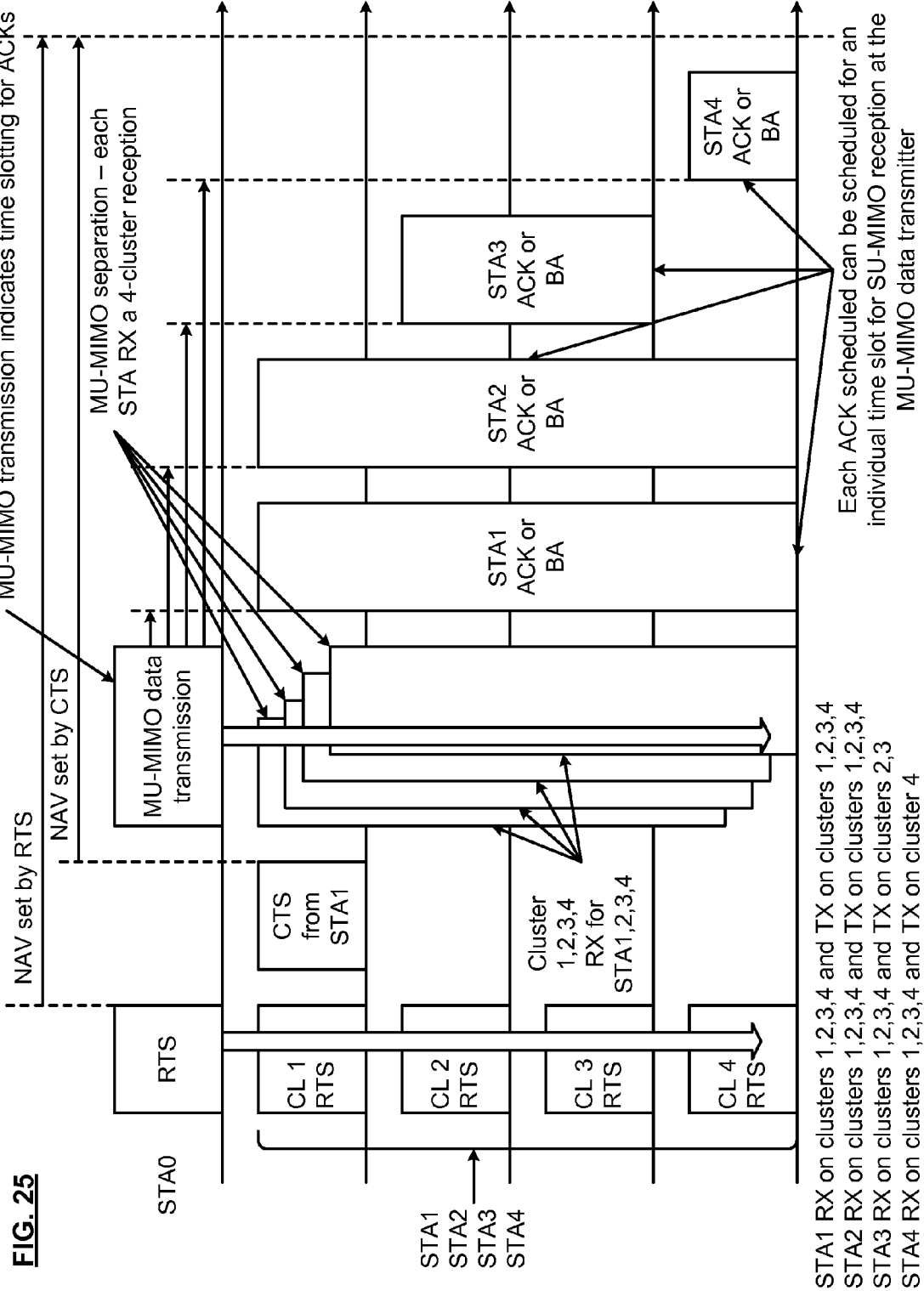

FIG. 25 illustrates a time slotted or scheduled ACK sequence with multi-cluster MU-MIMO data transmission. With example of FIG. 25, STA1 receives on clusters 1, 2, 3, and 4 and transmits on clusters 1, 2, 3, and 4 (all clusters), STA2 receives on clusters 1, 2, 3, and 4 and transmits on clusters 1, 2, 3, and 4 (all clusters), STA3 receives on clusters 1, 2, 3, and 4 and transmits on clusters 2 and 3, and STA4 receives on clusters 1, 2, 3, and 4 and transmits only on cluster 4.

Figure 26:
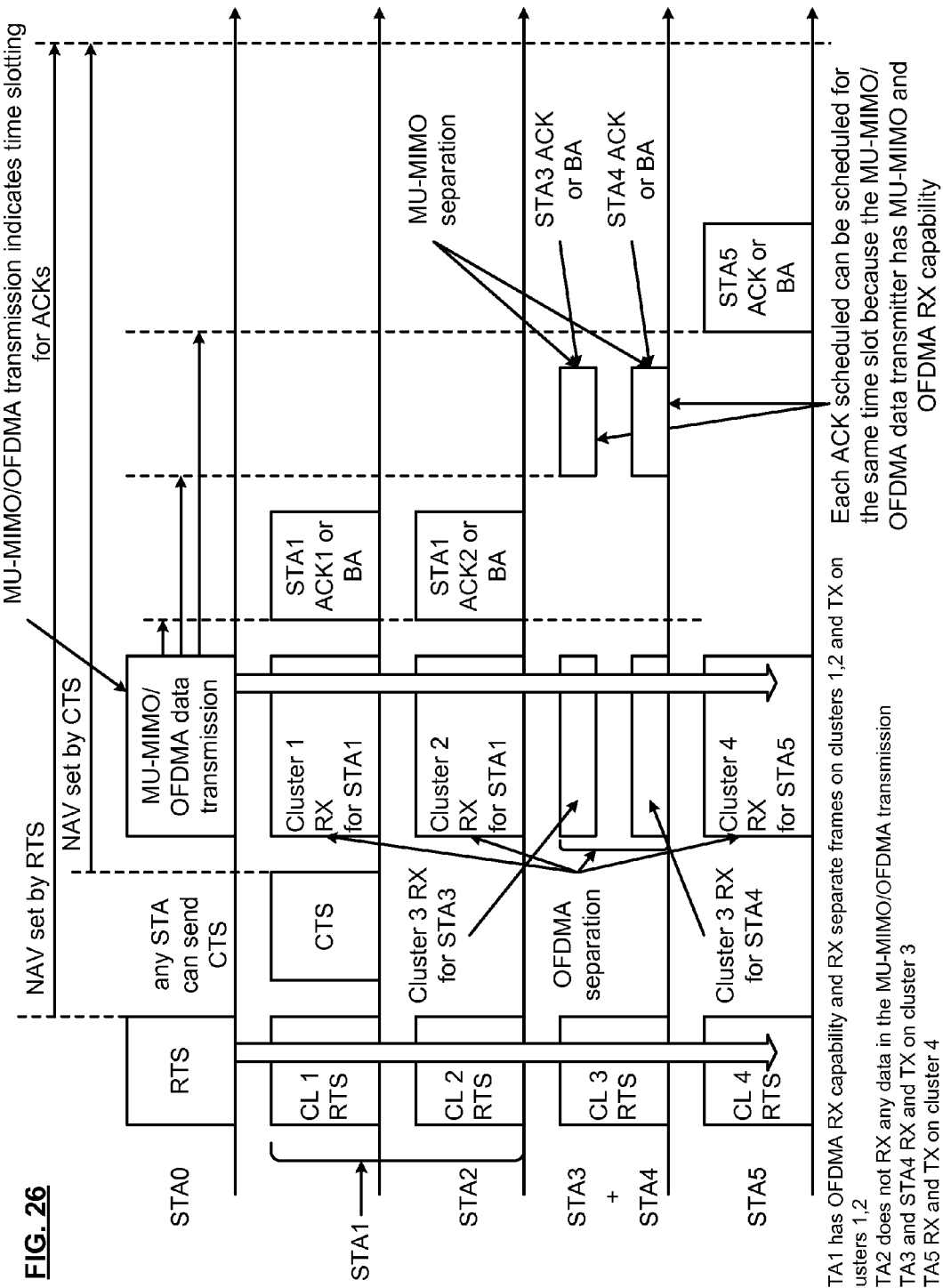

FIG. 26 illustrates a time slotted or scheduled ACK sequence with STAs sharing clusters, e.g., OFDMA+MU-MIMO. FIG. 26 shows in particular an ACK scheduling example for MU-MIMO/OFDMA receive capability of an MU-MIMO/OFDMA data transmitter. With the example of FIG. 26, STA1 has OFDMA receive capability and receives separate frames on clusters 1 and 2 and transmits on clusters 1 and 2, STA2 does not receive any data in the MU-MIMO/OFDMA transmission, STA3 and STA4 receive and transmit on cluster 3, and STA5 receives and transmits on cluster 4.

Figure 27:
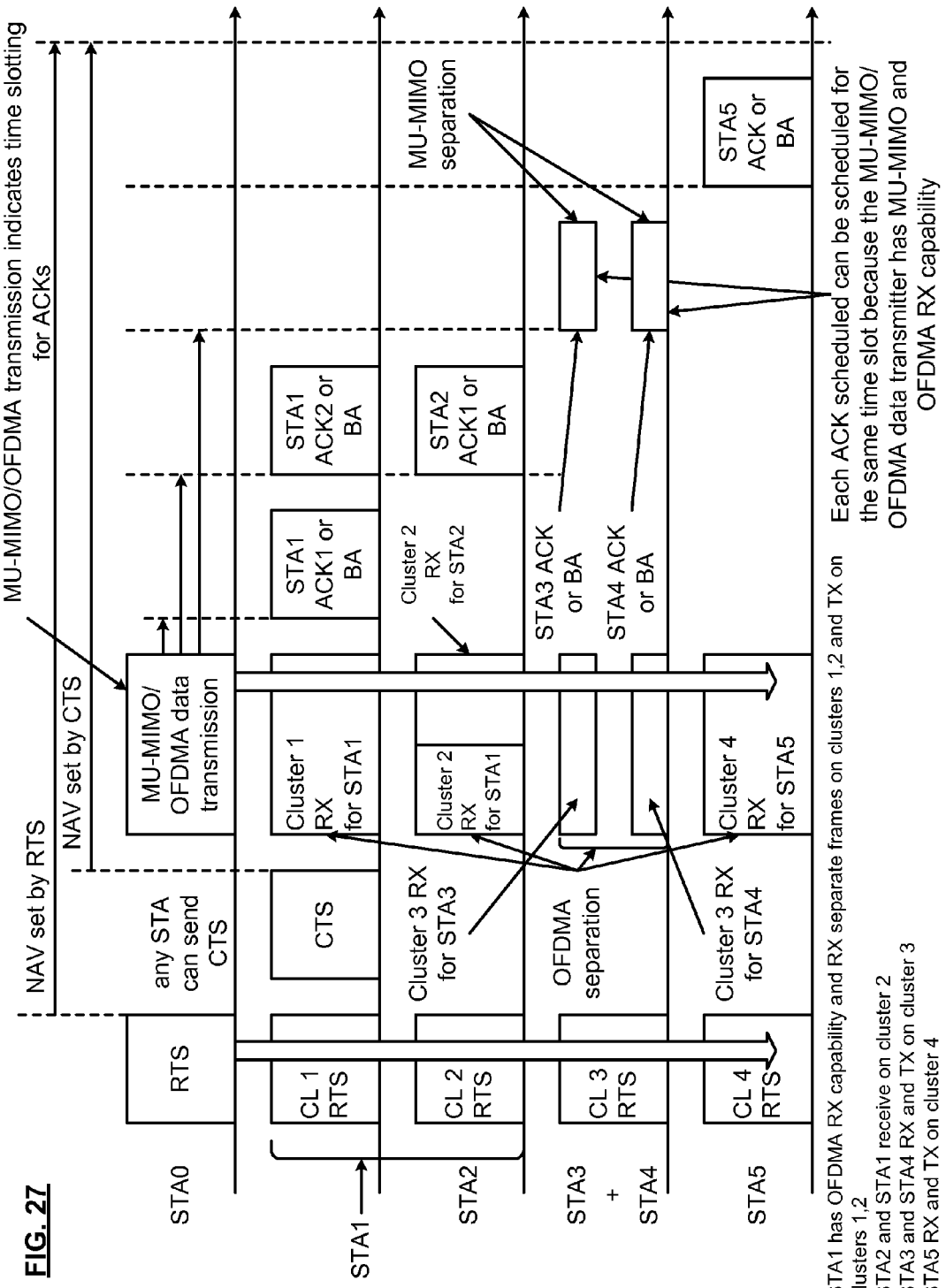

FIG. 27 illustrates a time slotted or scheduled ACK sequence with STAs sharing clusters, e.g., OFDMA+MU-MIMO. FIG. 27 shows in particular an ACK scheduling example for MU-MIMO/OFDMA receive capability of an MU-MIMO/OFDMA data transmitter. With the example of FIG. 27, STA1 has OFDMA receive capability and receives separate frames on clusters 1 and 2 and transmits separate ACKs for the separate frames on clusters 1 and 2. STA2 also receives on cluster 2 and transmits on cluster 2. As can be seen, Cluster 2 is employed for receiving for both STA1 and STA2. STA3 and STA4 receive and transmit on cluster 3, and STA5 receives and transmits on cluster 4. STA3 and STA4 also have MU-MIMO separation (e.g., spatial separation) within cluster 3. Within the sequence depicted in FIG. 27, the MU-MIMO/OFDMA data transmitter can schedule the ACK transmissions for STA3 and STA4 to be sequential, for example, within cluster 3 instead of in parallel as shown.

Figure 28:
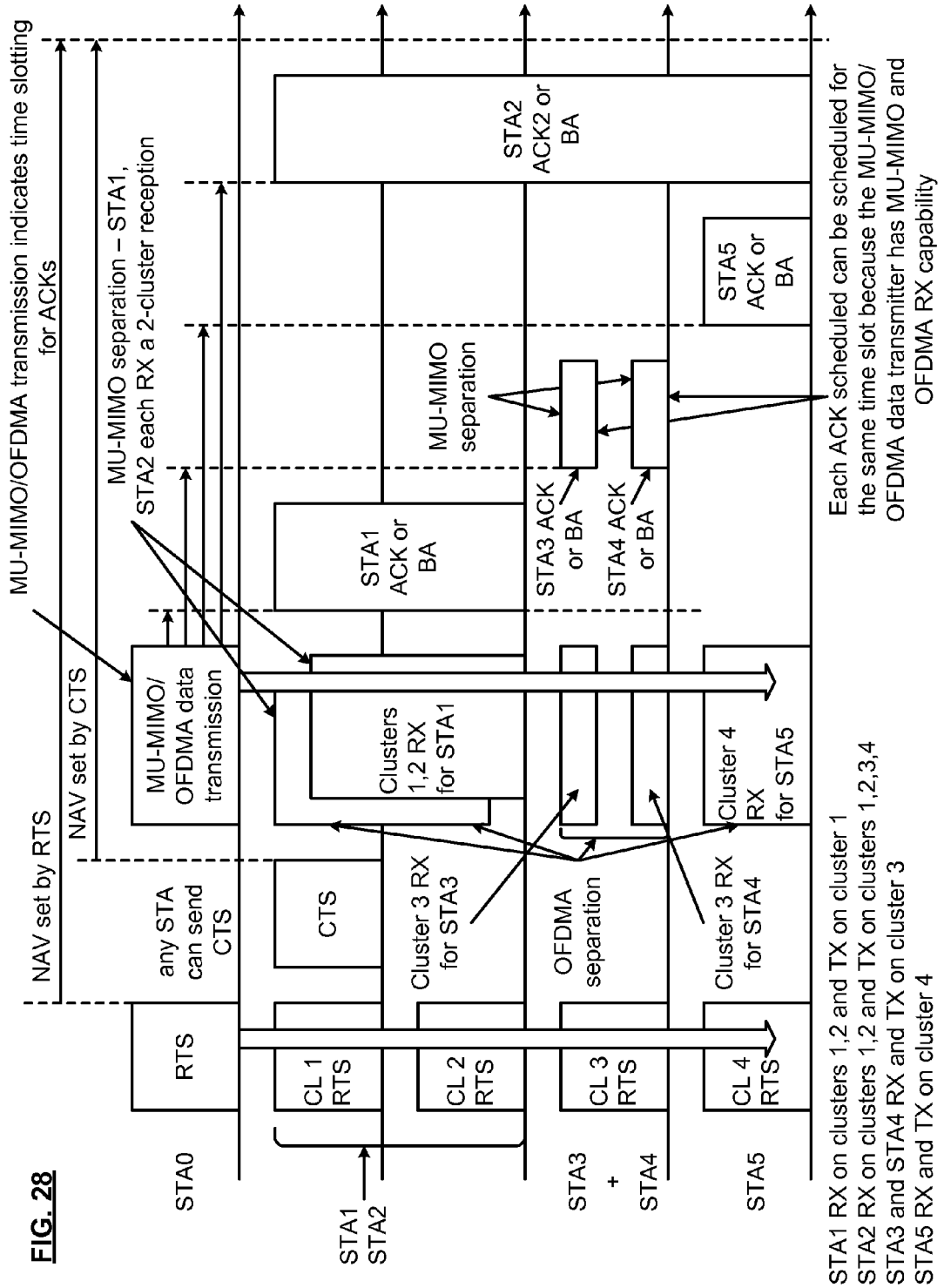

FIG. 28 illustrates a time slotted or scheduled ACK sequence with STAs sharing clusters, e.g., OFDMA+MU-MIMO. FIG. 28 shows in particular an ACK scheduling example for MU-MIMO/OFDMA receive capability of an MU-MIMO/OFDMA data transmitter. With the example of FIG. 28, STA1 receives on clusters 1 and 2 and transmits on clusters 1 and 2. STA2 receives on clusters 1 and 2 and transmits on clusters 1, 2, 3, and 4. STA3 and STA4 receive and transmit on cluster 3, and STA5 receives and transmits on cluster 4. STA3 and STA4 also have MU-MIMO separation (e.g., spatial separation) within cluster 3.

Figure 29:
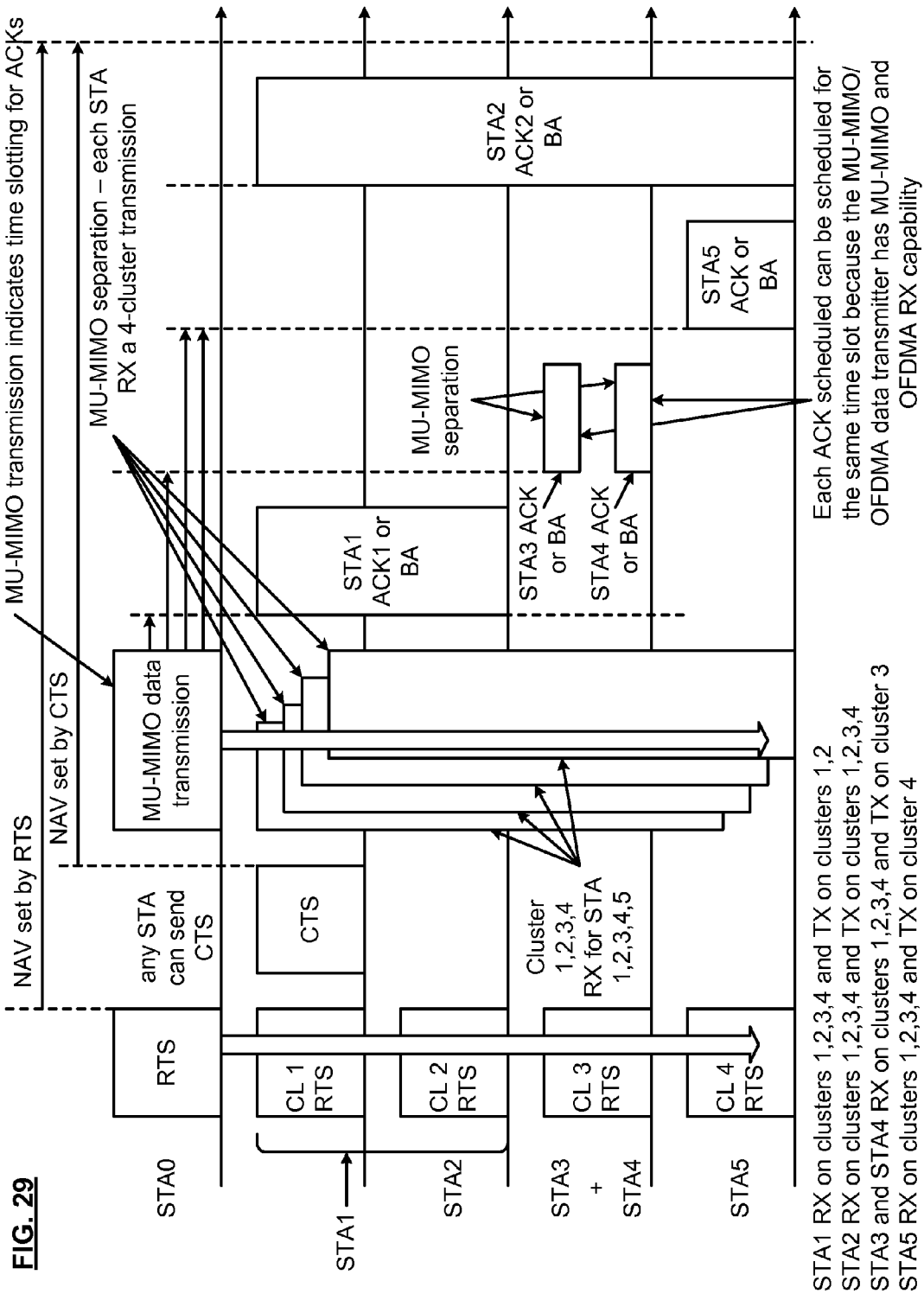

FIG. 29 illustrates a time slotted ACK sequence, in particular an ACK scheduling example for MU-MIMO receive capability of an MU-MIMO data transmitter. With the example of FIG. 29, STA1 receives on clusters 1, 2, 3, and 4 and transmits on clusters 1 and 2. STA2 receives on clusters 1, 2, 3, and 4 and transmits on clusters 1, 2, 3, and 4. STA3 receives on clusters 1, 2, 3, and 4 and transmits on cluster 3. STA4 receives on clusters 1, 2, 3, and 4 and transmits on cluster 3. STA5 receives on clusters 1, 2, 3, and 4 and transmits on cluster 4.

FIGS. 30, 31, and 32 are signal diagrams illustrating various embodiments of polled ACK operations of transmitting and receiving WLAN devices.

Additional embodiments may operate in accordance with polling of the various receivers (e.g., STAs) to request their respective ACKs. For example, an OFDMA frame may be employed to give explicit polling information to the STAs for the transmitting device (e.g., AP) then to retrieve the respective ACKs there from. For example, the data transmitter (e.g., AP) then follows data transmission of OFDMA/MU-MIMO with polling of the receivers (e.g., STAs). The data transmitter (e.g., AP) may poll more than one recipient at a time (i.e. OFDMA/MU-MIMO poll frame, OFDMA Poll frame, MU-MIMO poll frame, OFDM Poll frame, other combination, etc.). Employing such polling functionality may operate to reduce collision overhead versus a scheme that allows carrier sense multiple access (CSMA)-determined ACK responses. Such polling may eliminate the need for explicit ACK transmission parameters (e.g., ACK transmission timing and ACK transmission cluster assignment) that would have been placed within the SACK field of PHY headers or MAC headers of the data transmissions had polling not been employed. Some of the ACK transmission parameters (e.g., ACK transmission cluster assignment) may still be provided within a poll frame.

Receiving devices respond to polls with ACK information. These operations may combine reverse direction DATA with ACK information in response to a poll, which saves on overhead and increases throughput. Further, these operations allow the data transmitter to control variables to meet quality of service (QoS) scheduling goals because these operations allow the OFDMA/MU-MIMO data transmitter to control reverse direction traffic timing. With these operations, polled ACK/reverse data may be transmitted on different cluster(s). More than one cluster may be used to transmit the reverse data, as per permission from poll frame. A responder's combined ACK and reverse data transmission may be done on clusters that were not used to transmit data to that responder. Multiple ACKs may be received simultaneously if the Poll frame was to multiple receivers. Such operation requires that data transmitter (e.g., AP) supports multiple simultaneous reception (i.e. OFDMA/MU-MIMO reception).

The data transmitter may specify a single cluster to transmit the combined ACK and reverse data. Information may be relayed on a single cluster to all recipients which requires all recipients to switch to that cluster at, for example, the end of the OFDMA/MU-MIMO data transmission. Alternatively, the poll frames may appear on different clusters simultaneously or at different times so that STAs donot need to switch clusters after reception of the data transmission.

FIG. 30 illustrates a polled ACK sequence when STAs share clusters, e.g., OFDMA & MU-MIMO. The example of FIG. 30 shows an ACK scheduling example for MU-MIMO/OFDMA receive capability of a MU-MIMO/OFDMA data transmitter. With the example of FIG. 30, STA1 receives on clusters 1 and 2 and is given permission to transmit on cluster 1 and cluster 2 by receipt of a poll frame on cluster 1. STA2 does not receive any data in the MU-MIMO/OFDMA transmission. STA3 and STA4 receive on cluster 3 after receiving a poll frame on cluster 3, transmit on cluster 3. STA5 receives on cluster 4 and after receiving a poll frame on cluster 3, transmits on cluster 4. The polls sent to STAs 3, 4, 5 are transmitted as a single MU-MIMO/OFDMA transmission by STA0.

FIG. 31 illustrates another example of a polled ACK sequence when STAs share clusters, e.g., OFDMA & MU-MIMO. The example of FIG. 31 shows an ACK scheduling example for MU-MIMO/OFDMA receive capability of a MU-MIMO/OFDMA data transmitter. With the example of FIG. 31, STA1 receives on clusters 1 and 2 and is given permission to transmit on cluster 1 and cluster 2, STA2 does not receive any data in the MU-MIMO/OFDMA transmission, STA3 and STA4 receive and transmit on cluster 3, and STA5 receives and transmits on cluster 4. Note that the operations of FIG. 31 differ slightly from those of FIG. 30 with regard to STA1 sends a single ACK or BA frame instead of a pair of ACK or BA frames.

FIG. 32 illustrates another example of a polled ACK sequence when STAs share clusters, e.g., OFDMA & MU-MIMO. The example of FIG. 32 shows an ACK scheduling example for MU-MIMO/OFDMA receive capability of a MU-MIMO/OFDMA data transmitter. With the example of FIG. 31, STA1 receives on clusters 1 and 2 and is allowed to transmit only on cluster 1, but in doing so, transmits not only an ACK or BA, but also some DATA to STA0 as the extra time required to do so is indicated by the poll frame sent from STA0 to STA1. STA2 does not receive any data in the MU-MIMO/OFDMA transmission. STA3 and STA4 receive and transmit on cluster 3, and STA5 receives and transmits on cluster 4. STA3 and STA4 also receive indication in their received poll frames that DATA may be sent to STA0.

FIG. 32 illustrates a time slotted or scheduled acknowledgement sequence with aggregated data. With the example of FIG. 32, STA1 receives data on clusters 1 and 2, receives poll on clusters 1, 2, 3, 4 and transmits ACK on cluster 1 and cluster 2 and also some DATA to STA0 as the extra time required to do so is indicated by the poll frame sent from STA0 to STA1, STA2 does not receive any data in the MU- MIMO/OFDMA transmission. STA3 and STA4 receive and transmit on cluster 3. STA5 receives and transmits on cluster 4. STA3 and STA4 also receive indication in their received poll frames that DATA may be sent to STA0.

FIGS. 33 and 34 are signal diagrams illustrating various examples of reverse data aggregations ACK operations of transmitting and receiving WLAN devices. With these examples, the ACK can be aggregated with reverse data which may be OFDMA/MU-MIMO. With these operations the scheduled arrangement reduces collision overhead. Further, the cluster assignment(s) may be different for data transmission and reverse data transmission. The reverse data transmissions may be based upon reverse data permission according to acknowledgement time slot duration and/or according to explicit permission to transmit reverse data, e.g., a reverse data permission bit may be included in the SACK field of the MU-MIMO/OFDMA data transmission.

FIG. 33 illustrates a time slotted or scheduled acknowledgement sequence with aggregated data. With the example of FIG. 33, STA1 receives on clusters 1 and 2 and transmits ACK and DATA on cluster 1 and cluster 2, STA2 does not receive any data in the MU-MIMO/OFDMA transmission, STA3 and STA4 receive and transmit on cluster 3, and STA5 receives and transmits on cluster 4.

FIG. 34 illustrates a time slotted or scheduled acknowledgement sequence with aggregated data. With the example of FIG. 34, STA1 receives on cluster 1 and transmits ACK and DATA on cluster 2, STA2 does not receive any data in the MU-MIMO/OFDMA transmission, STA3 and STA4 receive and transmit on cluster 3, and STA5 receives and transmits on cluster 4.

It is noted that the various modules and/or circuitries (e.g., baseband processing modules, encoding modules and/or circuitries, decoding modules and/or circuitries, etc., etc.) described herein may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The operational instructions may be stored in a memory. The memory may be a single memory device or a plurality of memory devices. Such a memory device may be a read-only memory (ROM), random access memory (RAM), volatile memory, non-volatile memory, static memory, dynamic memory, flash memory, and/or any device that stores digital information. It is also noted that when the processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. In such an embodiment, a memory stores, and a processing module coupled thereto executes, operational instructions corresponding to at least some of the steps and/or functions illustrated and/or described herein.

It is also noted that any of the connections or couplings between the various modules, circuits, functional blocks, components, devices, etc. within any of the various diagrams or as described herein may be differently implemented in different embodiments. For example, in one embodiment, such connections or couplings may be direct connections or direct couplings there between. In another embodiment, such connections or couplings may be indirect connections or indirect couplings there between (e.g., with one or more intervening components there between). Of course, certain other embodiments may have some combinations of such connections or couplings therein such that some of the connections or couplings are direct, while others are indirect. Different implementations may be employed for effectuating communicative coupling between modules, circuits, functional blocks, components, devices, etc. without departing from the scope and spirit of the invention.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

Various aspects of the present invention have also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

Various aspects of the present invention have been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, various aspects of the present invention are not limited to such embodiments. It will be obvious to one of average skill in the art that various changes and modifications may be practiced within the spirit and scope of the invention, as limited only by the scope of the appended claims.

Mode Selection Tables:

TABLE 1

2.4 GHz, 20/22 MHz channel BW, 54 Mbps max bit rate

| Rate | Modulation | Code Rate | NBPSC | NCBPS | NDBPS | EVM | Sensitivity | ACR | AACR |
|---|---|---|---|---|---|---|---|---|---|
| 1 | Barker BPSK | | | | | | | | |
| 2 | Barker QPSK | | | | | | | | |
| 5.5 | CCK | | | | | | | | |
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 11 | CCK | | | | | | | | |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 2

Channelization for Table 1

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 3

Power Spectral Density (PSD) Mask for Table 1

| PSD Mask Frequency Offset | 1 dBr |
|---|---|
| −9 MHz to 9 MHz | 0 |
| +/−11 MHz | −20 |
| +/−20 MHz | −28 |
| +/−30 MHz and greater | −50 |

TABLE 4

5 GHz, 20 MHz channel BW, 54 Mbps max bit rate

| Rate | Modulation | Code Rate | NBPSC | NCBPS | NDBPS | EVM | Sensitivity | ACR | AACR |
|---|---|---|---|---|---|---|---|---|---|
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 5

Channelization for Table 4

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |

TABLE 5-continued

Channelization for Table 4

| Channel | Frequency (MHz) | Country | Channel | Frequency (MHz) | Country |
|---|---|---|---|---|---|
| 157 | 5785 | USA | | | |
| 161 | 5805 | USA | | | |
| 165 | 5825 | USA | | | |

TABLE 6

2.4 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 7

Channelization for Table 6

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 8

5 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 9 channelization for Table 8

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 10

5 GHz, with 40 MHz channels and max bit rate of 486 Mbps

| Rate | | TX Antennas | ST Code Rate | Modulation | Code Rate | NBPSC |
|---|---|---|---|---|---|---|
| 13.5 | Mbps | 1 | 1 | BPSK | 0.5 | 1 |
| 27 | Mbps | 1 | 1 | QPSK | 0.5 | 2 |
| 54 | Mbps | 1 | 1 | 16-QAM | 0.5 | 4 |
| 108 | Mbps | 1 | 1 | 64-QAM | 0.666 | 6 |
| 121.5 | Mbps | 1 | 1 | 64-QAM | 0.75 | 6 |
| 27 | Mbps | 2 | 1 | BPSK | 0.5 | 1 |
| 54 | Mbps | 2 | 1 | QPSK | 0.5 | 2 |
| 108 | Mbps | 2 | 1 | 16-QAM | 0.5 | 4 |
| 216 | Mbps | 2 | 1 | 64-QAM | 0.666 | 6 |
| 243 | Mbps | 2 | 1 | 64-QAM | 0.75 | 6 |
| 40.5 | Mbps | 3 | 1 | BPSK | 0.5 | 1 |
| 81 | Mbps | 3 | 1 | QPSK | 0.5 | 2 |
| 162 | Mbps | 3 | 1 | 16-QAM | 0.5 | 4 |
| 324 | Mbps | 3 | 1 | 64-QAM | 0.666 | 6 |
| 365.5 | Mbps | 3 | 1 | 64-QAM | 0.75 | 6 |
| 54 | Mbps | 4 | 1 | BPSK | 0.5 | 1 |
| 108 | Mbps | 4 | 1 | QPSK | 0.5 | 2 |

TABLE 10-continued

5 GHz, with 40 MHz channels and max bit rate of 486 Mbps

| Rate | TX Antennas | ST Code Rate | Modulation | Code Rate | NBPSC |
|---|---|---|---|---|---|
| 216 Mbps | 4 | 1 | 16-QAM | 0.5 | 4 |
| 432 Mbps | 4 | 1 | 64-QAM | 0.666 | 6 |
| 486 Mbps | 4 | 1 | 64-QAM | 0.75 | 6 |

TABLE 11

Power Spectral Density (PSD) mask for Table 10

| PSD Mask Frequency Offset | 2 dBr |
|---|---|
| −19 MHz to 19 MHz | 0 |
| +/−21 MHz | −20 |
| +/−30 MHz | −28 |
| +/−40 MHz and greater | −50 |

TABLE 12

Channelization for Table 10

| Channel | Frequency (MHz) | Country | Channel | Frequency (MHz) | County |
|---|---|---|---|---|---|
| 242 | 4930 | Japan | | | |
| 250 | 4970 | Japan | | | |
| 12 | 5060 | Japan | | | |
| 38 | 5190 | USA/Europe | 36 | 5180 | Japan |
| 46 | 5230 | USA/Europe | 44 | 5520 | Japan |
| 54 | 5270 | USA/Europe | | | |
| 62 | 5310 | USA/Europe | | | |
| 102 | 5510 | USA/Europe | | | |
| 110 | 5550 | USA/Europe | | | |
| 118 | 5590 | USA/Europe | | | |
| 126 | 5630 | USA/Europe | | | |
| 134 | 5670 | USA/Europe | | | |
| 151 | 5755 | USA | | | |
| 159 | 5795 | USA | | | |

What is claimed is:

1. An apparatus, comprising:
a baseband processing module to generate a multi-user packet;
at least one antenna to:
transmit the multi-user packet to the plurality of wireless communication devices; and
in response to the multi-user packet, receive a plurality of acknowledgements from a plurality of wireless communication devices or from a subset of the plurality of wireless communication devices; and wherein:
the multi-user packet including a plurality of acknowledgement instructions corresponding respectively to each of the plurality of wireless communication devices; and
the plurality of acknowledgement instructions indicating a plurality of clusters for use, respectively, by the plurality of wireless communication devices for providing the plurality of acknowledgements.

2. The apparatus of claim 1, wherein:
the multi-user packet being a multiple input multiple output (MU-MIMO) packet or an orthogonal frequency division multiple access (OFDMA) packet.

3. The apparatus of claim 1, wherein:
the plurality of wireless communication devices including at least one multiple input multiple output (MU-MIMO) wireless communication device and at least one orthogonal frequency division multiple access (OFDMA) wireless communication device.

4. The apparatus of claim 1, wherein:
the plurality of acknowledgement instructions including scheduling information directing the plurality of wireless communication devices for providing the plurality of acknowledgements; or
the plurality of acknowledgement instructions including time slotted acknowledgement information directing the plurality of wireless communication devices for providing the plurality of acknowledgements.

5. The apparatus of claim 1, wherein:
the plurality of acknowledgement instructions directing an order by which the plurality of wireless communication devices providing the plurality of acknowledgements;
the order providing for a first of the plurality of wireless communication devices providing a first of the plurality of acknowledgements during a first time; and
the order providing for a second of the plurality of wireless communication devices providing a second of the plurality of acknowledgements during a second time.

6. The apparatus of claim 1, wherein:
at least one of the plurality of wireless communication devices being a wireless communication device, a cellular telephone, a two-way radio, a personal digital assistant (PDA), a personal computer (PC), a laptop computer, or home entertainment equipment.

7. The apparatus of claim 1, wherein:
a first of the plurality of clusters being composed of at least one channel within a first band; and
a second of the plurality of clusters being composed of at least one channel within a second band.

8. The apparatus of claim 1, wherein:
a first of the plurality of clusters being composed of a first plurality of channels among a first band and a second band; and
a second of the plurality of clusters being composed of a second plurality of channels among a third band and a fourth band.

9. The apparatus of claim 1, wherein:
one of the plurality of clusters including a band; and
at least two of the plurality of acknowledgements being providing within the band.

10. The apparatus of claim 1, wherein:
one of the plurality of clusters being composed of at least one channel within at least one band.

11. The apparatus of claim 1, wherein:
the plurality of acknowledgement instructions directing at least one of the plurality of wireless communication devices providing data to the apparatus in aggregation with its respective acknowledgement.

12. The apparatus of claim 1, wherein:
the multi-user packet includes a wireless communication device scheduled acknowledgement slot end time and the plurality of clusters for use, respectively, by the plurality of wireless communication devices for providing the plurality of acknowledgements.

13. The apparatus of claim 1, wherein:
the apparatus simultaneously receiving at least two of the plurality of acknowledgements.

14. The apparatus of claim 1, wherein:
the apparatus being an access point (AP); and
the plurality of wireless communication devices being a plurality of wireless stations (STAs).

15. An apparatus, comprising:
a baseband processing module to generate a multi-user packet;
at least one antenna to:
transmit the multi-user packet to a plurality of wireless communication devices;
after transmitting the multi-user packet to the plurality of wireless communication devices, poll the plurality of wireless communication devices thereby requesting a plurality of acknowledgements from the plurality of wireless communication devices, the polling including a plurality of acknowledgement instructions corresponding respectively to each of the plurality of wireless communication devices; and
in response to the polling, receive a plurality of acknowledgements from a plurality of wireless communication devices or from a subset of the plurality of wireless communication devices; and
the plurality of acknowledgement instructions indicating a plurality of clusters for use, respectively, by the plurality of wireless communication devices for providing the plurality of acknowledgements.

16. The apparatus of claim 15, wherein:
the multi-user packet being a multiple input multiple output (MU-MIMO) packet or an orthogonal frequency division multiple access (OFDMA) packet.

17. The apparatus of claim 15, wherein:
the plurality of wireless communication devices including at least one multiple input multiple output (MU-MIMO) wireless communication device and at least one orthogonal frequency division multiple access (OFDMA) wireless communication device.

18. The apparatus of claim 15, wherein:
the plurality of acknowledgement instructions directing an order by which the plurality of wireless communication devices providing the plurality of acknowledgements;
the order providing for a first of the plurality of wireless communication devices providing a first of the plurality of acknowledgements during a first time; and
the order providing for a second of the plurality of wireless communication devices providing a second of the acknowledgements during a second time.

19. The apparatus of claim 15, wherein:
at least one of the plurality of wireless communication devices being a wireless communication device, a cellular telephone, a two-way radio, a personal digital assistant (PDA), a personal computer (PC), a laptop computer, or home entertainment equipment.

20. The apparatus of claim 15, wherein:
a first of the plurality of clusters being composed of at least one channel within a first band; and
a second of the plurality of clusters being composed of at least one channel within a second band.

21. The apparatus of claim 15, wherein:
a first of the plurality of clusters being composed of a first plurality of channels among a first band and a second band; and
a second of the plurality of clusters being composed of a second plurality of channels among a third band and a fourth band.

22. The apparatus of claim 15, wherein:
one of the plurality of clusters being composed of at least one channel within at least one band.

23. The apparatus of claim 15, wherein:
the plurality of acknowledgement instructions directing at least one of the plurality of wireless communication devices providing data to the apparatus in aggregation with its respective acknowledgement.

24. The apparatus of claim 15, wherein:
the apparatus simultaneously receiving at least two of the plurality of acknowledgements.

25. The apparatus of claim 15, wherein:
the apparatus being an access point (AP); and
the plurality of wireless communication devices being a plurality of wireless stations (STAs).

26. A method for operating a wireless communication device, comprising:
generating a multi-user packet;
transmitting the multi-user packet to a plurality of wireless communication devices, wherein the multi-user packet including a plurality of acknowledgement instructions corresponding respectively to each of the plurality of wireless communication devices; and
in response to the multi-user packet, receiving a plurality of acknowledgements from a plurality of wireless communication devices or from a subset of the plurality of wireless communication devices; and
the plurality of acknowledgement instructions indicating a plurality of clusters for use, respectively, by the plurality of wireless communication devices for providing the plurality of acknowledgements.

27. The method of claim 26, wherein:
the multi-user packet being a multiple input multiple output (MU-MIMO) packet or an orthogonal frequency division multiple access (OFDMA) packet.

28. The method of claim 26, wherein:
the plurality of wireless communication devices including at least one multiple input multiple output (MU-MIMO) wireless communication device and at least one orthogonal frequency division multiple access (OFDMA) wireless communication device.

29. The method of claim 26, wherein:
the plurality of acknowledgement instructions directing an order by which the plurality of wireless communication devices providing the plurality of acknowledgements;
the order providing for a first of the plurality of wireless communication devices providing a first of the plurality of acknowledgements during a first time; and
the order providing for a second of the plurality of wireless communication devices providing a second of the plurality of acknowledgements during a second time.

30. The method of claim 26, wherein:
at least one of the plurality of wireless communication devices being a wireless communication device, a cellular telephone, a two-way radio, a personal digital assistant (PDA), a personal computer (PC), a laptop computer, or home entertainment equipment.

31. The method of claim 26, wherein:
a first of the plurality of clusters being composed of at least one channel within a first band; and
a second of the plurality of clusters being composed of at least one channel within a second band.

32. The method of claim 26, wherein:
a first of the plurality of clusters being composed of a first plurality of channels among a first band and a second band; and
a second of the plurality of clusters being composed of a second plurality of channels among a third band and a fourth band.

33. The apparatus of claim 26, wherein:
one of the plurality of clusters being composed of at least one channel within at least one band.

34. The method of claim 26, wherein:
the plurality of acknowledgement instructions directing at least one of the plurality of wireless communication devices providing data to the apparatus in aggregation with its respective acknowledgement.

35. The method of claim 26, wherein:
the multi-user packet includes a wireless communication device scheduled acknowledgement slot end time and the plurality of clusters for use, respectively, by the plurality of wireless communication devices for providing the plurality of acknowledgements.

36. The method of claim 26, further comprising:
simultaneously receiving at least two of the plurality of acknowledgements.

37. The method of claim 26, wherein:
the wireless communication device being an access point (AP); and
the plurality of wireless communication devices being a plurality of wireless stations (STAs).

* * * * *

UNITED STATES PATENT AND TRADEMARK OFFICE
CERTIFICATE OF CORRECTION

| | | |
|---|---|---|
| PATENT NO. | : 8,498,359 B2 | Page 1 of 1 |
| APPLICATION NO. | : 12/794711 | |
| DATED | : July 30, 2013 | |
| INVENTOR(S) | : Joseph Paul Lauer et al. | |

It is certified that error appears in the above-identified patent and that said Letters Patent is hereby corrected as shown below:

Title page, Item (74) Attorney, Agent, or Firm: Replace "Garlcik & Markison" with --Garlick & Markison--

In the Claims

Col. 32, line 49, in claim 9: Replace "providing" with --provided--

Signed and Sealed this
Thirteenth Day of May, 2014

Michelle K. Lee
*Deputy Director of the United States Patent and Trademark Office*